(12) United States Patent
Goguen et al.

(10) Patent No.: US 7,171,338 B1
(45) Date of Patent: Jan. 30, 2007

(54) OUTPUT PERFORMANCE TRENDS OF A MASS STORAGE SYSTEM

(75) Inventors: Kenneth R. Goguen, Berlin, MA (US); Maureen A. Lally, Berlin, MA (US); John N. Lefferts, Sutton, MA (US); Paul F. Hale, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 79 days.

(21) Appl. No.: 09/642,267

(22) Filed: Aug. 18, 2000

(51) Int. Cl.
*G06F 11/30* (2006.01)
(52) U.S. Cl. .................... 702/186; 711/114
(58) Field of Classification Search ........ 702/182–186, 702/180, 117; 711/112–114, 117; 714/1–6
See application file for complete search history.

(56) References Cited

U.S. PATENT DOCUMENTS

| | | | | |
|---|---|---|---|---|
| 5,463,775 A | * | 10/1995 | DeWitt et al. | 702/186 |
| 5,586,059 A | * | 12/1996 | Oshelski et al. | 702/84 |
| 5,623,598 A | * | 4/1997 | Voigt et al. | 714/47 |
| 5,720,025 A | * | 2/1998 | Wilkes et al. | 714/6 |
| 5,726,912 A | * | 3/1998 | Krall, Jr. et al. | 702/186 |
| 5,726,913 A | * | 3/1998 | Grimsrud | 702/186 |
| 5,867,686 A | * | 2/1999 | Conner et al. | 711/168 |
| 5,953,689 A | * | 9/1999 | Hale et al. | 702/186 |
| 6,026,352 A | * | 2/2000 | Burns et al. | 702/182 |
| 6,128,717 A | * | 10/2000 | Harrison et al. | 711/202 |
| 6,154,850 A | * | 11/2000 | Idleman et al. | 714/5 |
| 6,154,853 A | * | 11/2000 | Kedem | 714/6 |
| 6,393,537 B1 | * | 5/2002 | Kern et al. | 711/162 |
| 6,845,344 B1 | * | 1/2005 | Lally et al. | 702/186 |
| 6,865,514 B1 | * | 3/2005 | Goguen et al. | 702/186 |

* cited by examiner

*Primary Examiner*—Edward Raymond
*Assistant Examiner*—Mary Catherine Baran
(74) *Attorney, Agent, or Firm*—Krishnendu Gupta; Penelope Wilson

(57) ABSTRACT

A method for measuring mass storage system performance in which the mass storage system has a plurality of disk drive storage elements controlled by a disk drive controller, the controller typically having a cache memory, and the controller receiving commands and data from and returning at least data to a plurality of host computers, provides the flexibility of issuing commands to the controller in a variety of different configurations from a plurality of hosts in a time synchronized and organized fashion. Some significant data reduction techniques control and organize the data for later analysis according to the invention. Effective presentation of collected data can be effected using a novel trends analysis presentation approach.

11 Claims, 45 Drawing Sheets

| REQUIRED | NUMBER OF LOGICAL DISKS | NUMBER OF "CHILD" PROCESSES TO START | NUMBER OF CAPTURE RESPONSE TIMES | NUMBER OF RESPONSE TIMES | BUFFER SIZE | OFFSET SIZE | MAXIMUM RANGE | TIME OF TEST | READ/WRITE SIZE | READ/WRITE MIX |
|---|---|---|---|---|---|---|---|---|---|---|
| | | | | | | | | | | |

FIG. 4A

| FIG. 4A |
|---|
| FIG. 4B |

FIG. 4

| | |
|---|---|
| | ID OF DEVICES BEING TESTED |
| | ID OF MASTER & CLIENT HOSTS |
| | I/O TYPE (SEQUENTIAL OR RANDOM) |
| | NUMBER OF I/O OPERATIONS PERFORMED TO CORRECT OFFSET |
| OPTIONAL | DISPLACEMENT FROM OFFSET |
| | DELAY BETWEEN COMMANDS |
| | INITIAL BYTE OFFSET |
| | NUMBER OF SEEKS FOR RANDOM I/O |
| | DATA REDUCTION METHOD |
| | ICDA PERCENT HIT RATE |

FIG. 4B

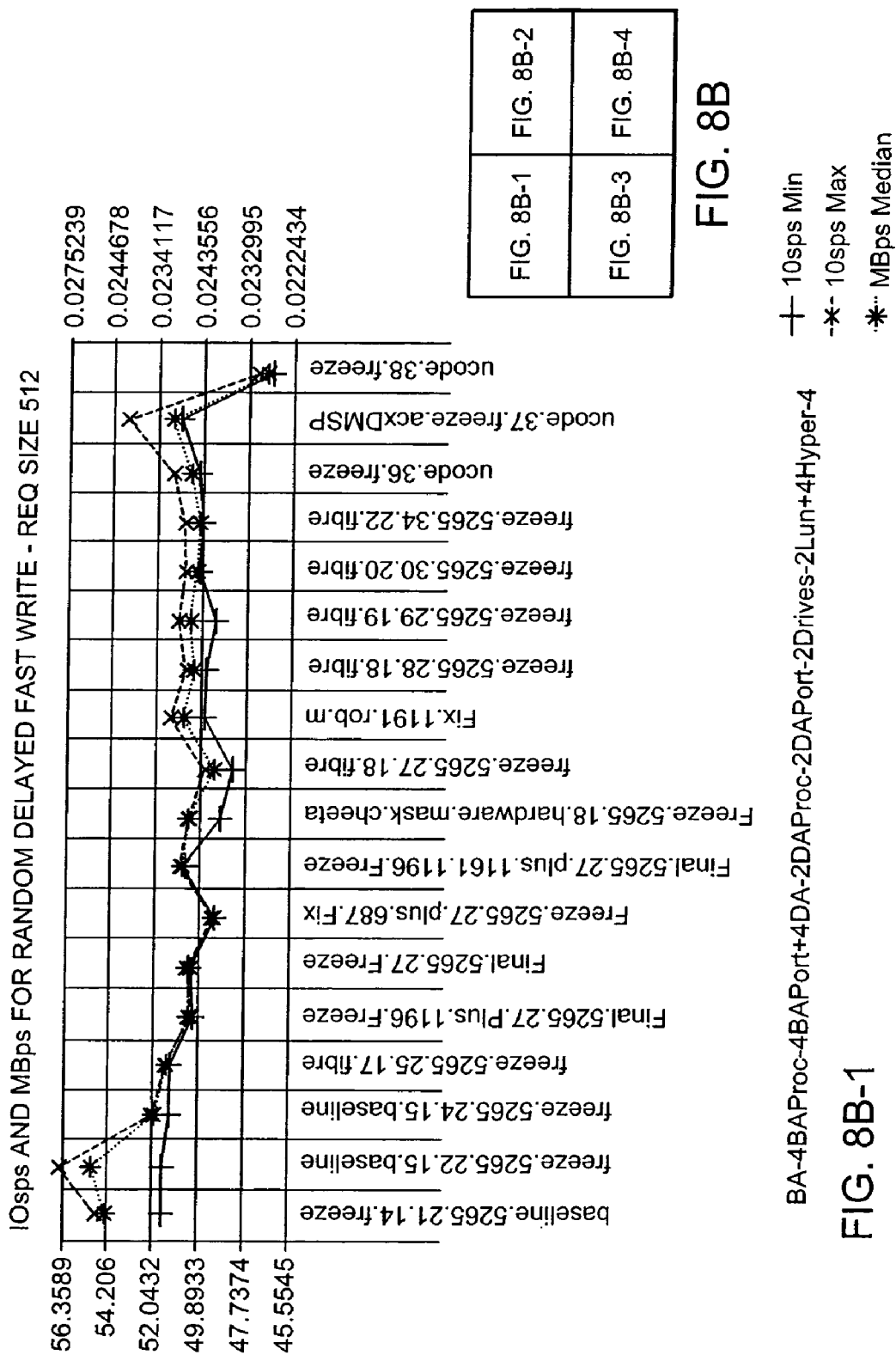

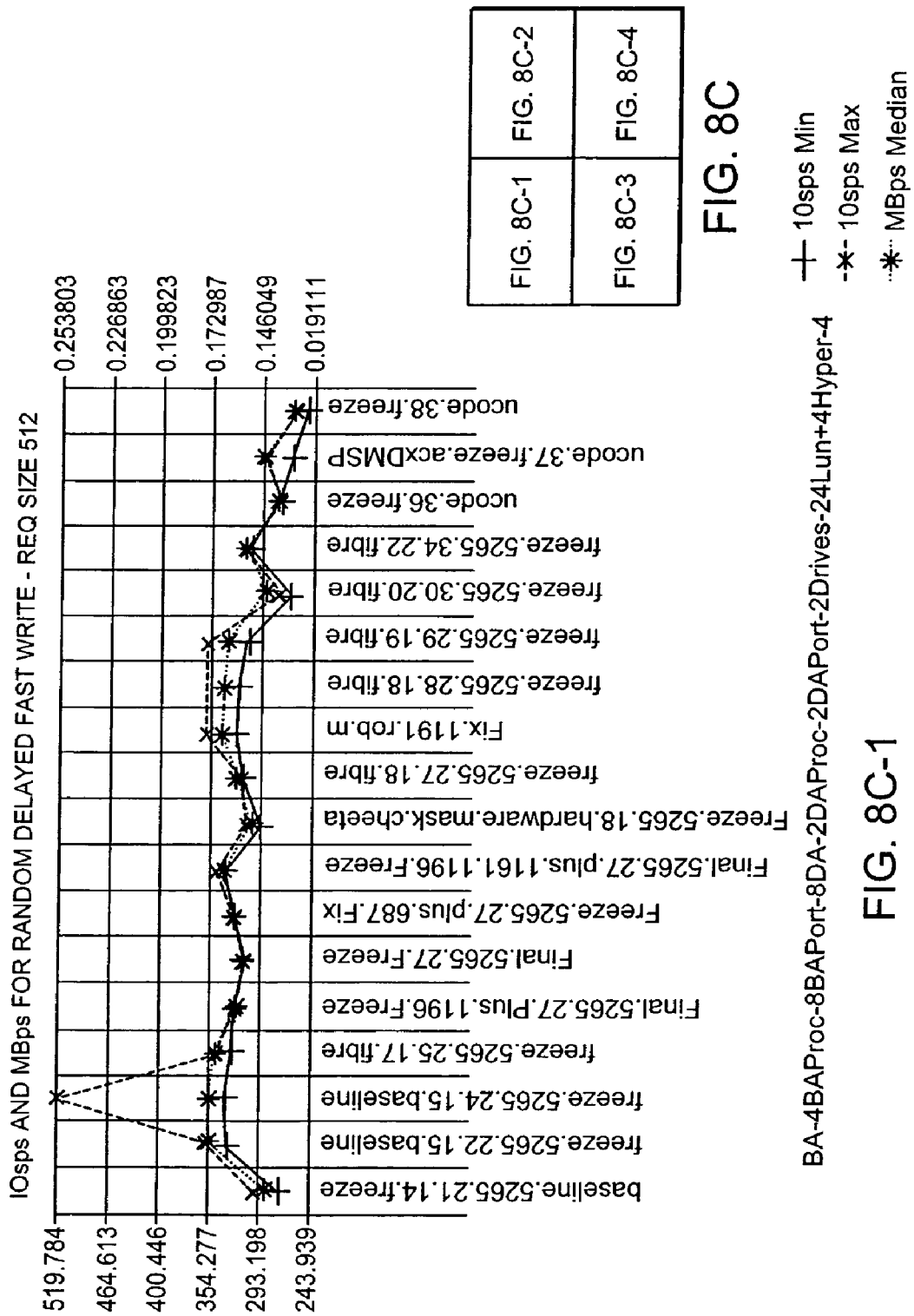

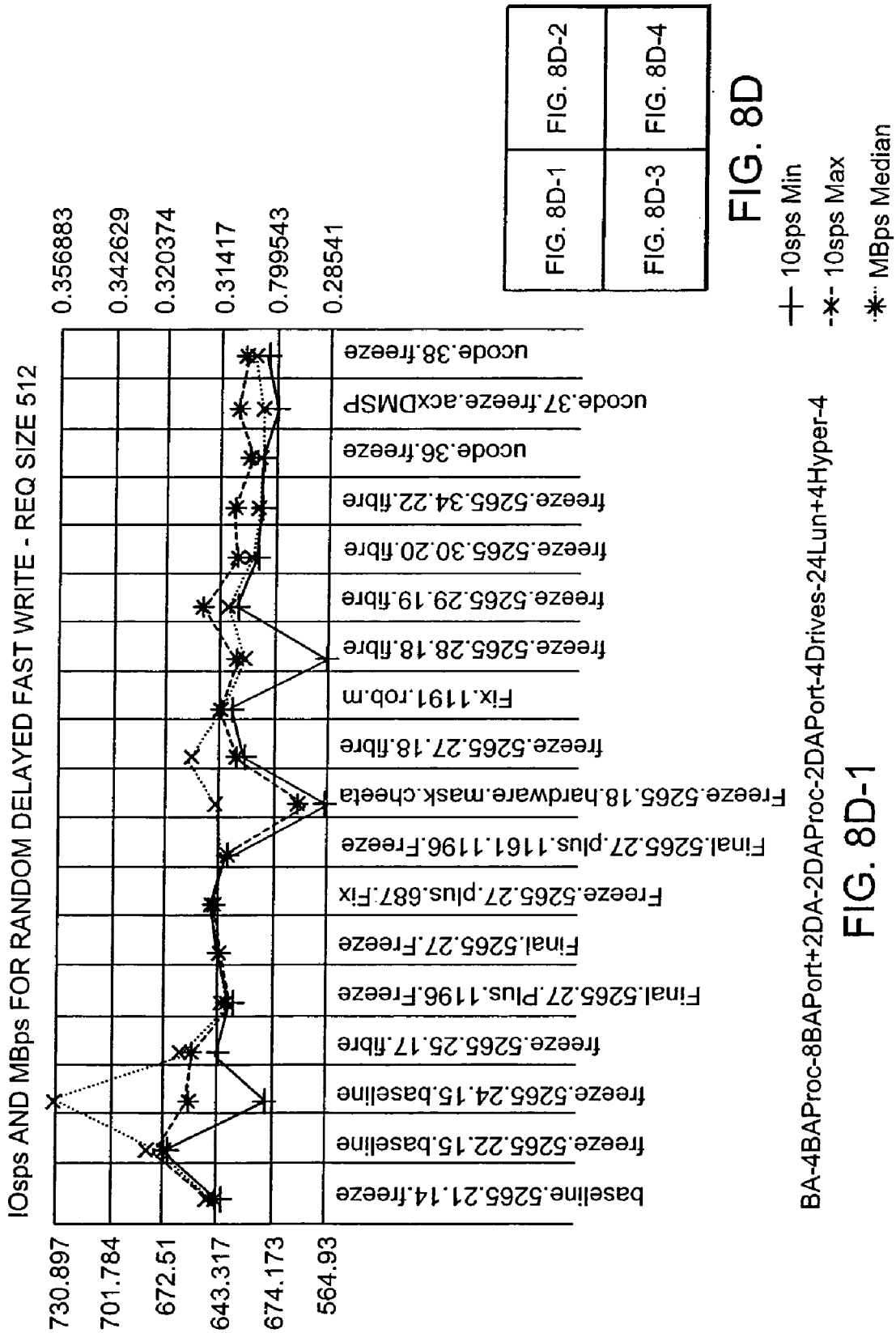

DEVICE DETAIL

Symmetrix

- Vendor Id: EMC
- Product Id: SYMMETRIX
- Symmetrix Id: 0001835000055
- Director: SA-16B
- Port Number: 1
- TID: 0
- LUN: 0
- Hyper Count: 2

Device Detail

- Symmetrix Device: 000
- Physical Device: \\.\PHYSICALDRIVE0
- Logical Device:
- Serial Number: 55000321
- Device Status: Ready
- Block Size: 512
- Capacity: 7741440
- Cylinders: 8064
- Emulation: FBA
- Mirror Policy: two-way mirror

Flags

- ☐ CKD
- ☐ ASSOC
- ☐ VCM
- ☐ Mixed
- ☑ META Head
- ☐ META Member
- ☐ Gatekeeper
- ☐ Multichannel
- ☐ PowerPath Parent
- ☐ PowerPath Child
- ☐ PowerPath Sibling
- ☐ No channel
- ☐ RDF
- ☐ BCS
- ☐ BCV
- ☑ META

SYMMETRIX DETAILS

Director Details

| | | | |
|---|---|---|---|
| Director: | FA-1A | Num Ports: | 1 |
| Director Type: | Fibre Adapter | Port 0 status: | On |
| Director Num: | 1 | Port 1 status: | N/A |
| Slot Num: | 1 | Port 2 status: | N/A |
| SCIS Width: | N/A | Port 3 status: | N/A |

FILE DESCRIPTIONS

| FILE NAME | DESCRIPTION | HIGHLIGHTS |
|---|---|---|
| Char.Summary | SUMMARY FILE OF EACH CHARACTERIZATION TEST BROKEN DOWN BY ITERATION, TEST TYPE, AND CONFIGURATION | |
| Char.Splus | DATA FILE FEED TO Splus TO CREATE CHARACTERIZATION OBJECTS | |
| Char.Errors | CHARACTERIZATION ERRORS PRODUCED FROM PROCESSING THE RAW DATA FILES. | MESSAGE APPEARS IF ERROR FILE EXISTS |
| SX.Summary | SX SUMMARY DATA BROKEN DOWN BY ITERATION, TEST TYPE AND CONFIGURATION | |
| SX.Splus | DATA FILE FEED TO Splus: USED WITH Char.Summary FILE TO CREATE CHARACTERIZATION OBJECTS | |
| SX.Errors | SX ERRORS FROM PROCESSING THE RAW DATA FILES | MESSAGE APPEARS IF ERROR FILE EXISTS |

FIG. 11A

| | | |
|---|---|---|
| DB.Table | SUMMARY FILE OF EACH DB SIMULATOR TEST BROKEN DOWN BY ITERATION, TEST TYPE AND CONFIGURATION | |
| DB.Splus | DATA FILE FEED TO Splus TO CREATE DBSimulator OBJECTS | |
| DB.Errors | DB SIMULATOR ERRORS PRODUCED FROM PROCESSING THE RAW DATA FILES | MESSAGE APPEARS IF ERROR FILE EXISTS |
| SX_DB.Summary | SX_DB SUMMARY DATA BROKEN DOWN BY ITERATION, TEST TYPE AND CONFIGURATION | |
| SX_DB.Splus | DATA FILE FEED TO Splus. USED WITH DB.Splus FILE TO CREATE DBSimulator OBJECTS | |
| SX_DB.Errors | SX_DB ERRORS PRODUCED FROM PROCESSING THE RAW DATA FILES | MESSAGE APPEARS IF ERROR FILE EXISTS |
| Cache Ratio Report | REPORT TRACKING THE CACHE RATIO FROM THE SYM AND THE PROCESSED DATA | REPORT NAME: "CacheRatioReport.txt" LOCATED IN THE RAW DATA FOLDER MESSAGE APPEARS IF A REPORT |

FIG. 11B

OUTPUT PERFORMANCE TRENDS OF A MASS STORAGE SYSTEM

BACKGROUND OF THE INVENTION

The invention relates generally to tools and systems for measuring the performance of mass storage systems, and more particularly, to methods and apparatus for developing, measuring, analyzing, and displaying the performance statistics of a plurality of disk drive elements controlled through a disk drive controller connected to a plurality of host computers.

As the size and complexity of computer systems increase, including the number of host computers and the number of disk drive elements, it becomes increasingly important to measure and understand the functions and parameters which affect the performance of the system. The performance of the system can be typically measured in terms of input/output (I/O) response times, that is, the time it takes for a read or write command to be acted upon, as far as the host computer is concerned, by the disk drive controller system.

It is well known, in the field, to measure, usually using a single parameter, the instantaneous or average response time of the system. Typically, a host computer outputs one or more I/O requests to the disk drive controller, and then measures the time for a response to be received from the disk drive controller. This time duration, while representative of the response of a specific read or write command to the disk drive system, is most often not representative of the actual performance which can be obtained from the system.

A similar distortion, not representative of system performance, can occur when average response time values are determined. For example, a disk controller, using a cache memory in its write process, can have substantially different write time responses depending upon the availability of cache memory. An average response (the average of, for example, a write where cache was available and one where cache was not available) would be misleading and meaningless.

The performance of a large storage system is particularly difficult to measure since more than one of the host computers, which connect to be disk drive controller(s), can operate at the same time, in a serial or in a parallel fashion. As a result, a plurality of disk drive elements, usually arranged in a disk drive array, operating in either an independent fashion, a RAID configuration, or a mirrored configuration, for example, can have a significant yet undetectable bandwidth or operational problem which cannot be addressed, or discovered, when commands are sent only from a single host computer.

In U.S. Pat. No. 5,953,689, issued Sep. 14, 1999, assigned to the assignee of this application, an improved method of time synchronizing a plurality of hosts operating in a variety of different configurations, and of issuing commands according to a prescribed sequence, was described. The method described in the above-identified patent features sending test requests, for the mass storage system, from a "main" host computer to each of a plurality of client host computers, executing at each host computer a test request sequence by sending commands to the mass storage system, accumulating at each host computer data regarding performance of the mass storage system, the data being in response to the requests or commands sent by each particular host computer, and sending, from each host computer to a master host computer, data regarding the performance of the mass storage system in response to the host generated commands. Significant data reduction techniques control and organize the data for later analysis.

While this system worked well, it had, at the time the application for the system was filed, specific limitations with regard to creating the test configurations and with regard to the flexibility of the analysis and processing once the statistics had been collected.

SUMMARY OF THE INVENTION

The invention relates to an improved method for measuring the system performance of a mass storage system having a plurality of disk drive storage elements controlled by a disk drive controller. Typically the disk drive controller has a cache memory. The controller receives commands and data from, and returns at least data to, typically, a plurality of host computers.

The method relates to presenting system performance to a user in a mass storage system. The storage system has a plurality of disk drive storage elements controlled by a disk drive controller, and the controller receives commands and data from and returns at least data to a plurality of host computers. The method features executing, at at least one host computer, a test request by sending commands to the mass storage system; accumulating, at at least the executing host computer, data regarding performance of the mass storage system in response to the requests sent by the host computer, and presenting the accumulated data in a graphical plot format, for enabling the visualization of trends in the performance of the mass storage system as a function of at least one selected parameter, in response to the host generated commands.

In particular aspects of the invention, the selected parameter is time; the accumulating step accumulates the data in a plurality of databases; and the method further features selecting one of the databases for test and viewing.

In yet other aspects of the invention, the method features the presenting step in which it either prints and/or displays on a cathode ray tube the data in the graphical plot format. Further, the method features selecting at least one test phase for viewing in the graphical plot format, as selected by the user. The method can also display, in association with the graphical plot format, parameters relating to the graph. The parameters can include one or more of, for example, the nature of the test, the size of data blocks which have been used, and the number of data ports.

Advantageously, therefore, the system easily, and in large part automatically, develops, measures, generates and analyzes statistics describing the dynamic performance of the mass storage system, from the host computers to the disk drive elements, wherein individual operations as well as sequences of operations can easily be set up, with selected initial conditions, and accurately and automatically tested according to desired criteria using graphical user interfaces. The method and apparatus of the invention further advantageously enable the user to easily configure, set, and determine read/write sequencing and a relative mix of read and write commands, as well as enabling the dynamic performance of the system to be repeatedly enabled and tested for consistency, accuracy, and effectiveness.

DESCRIPTION OF DRAWINGS

Other features and advantages of the invention will be apparent from the following description, taken together with the drawings, in which:

FIG. 4 is a map to the table represented by FIG. 4A and FIG. 4B.

FIG. 4A is the first part of a table used to show the arguments used in the testing.

FIG. 4B is the second part of a table used to show the arguments used in the testing.

FIGS. 8A1–8A4, 8B1–8B4, 8C1–8C4, 8D1–8D4 show examples of trends data presentation;

FIGS. 11A and 11B are two parts of a single table that illustrate various system database files.

DETAILED DESCRIPTION

Figure 1:
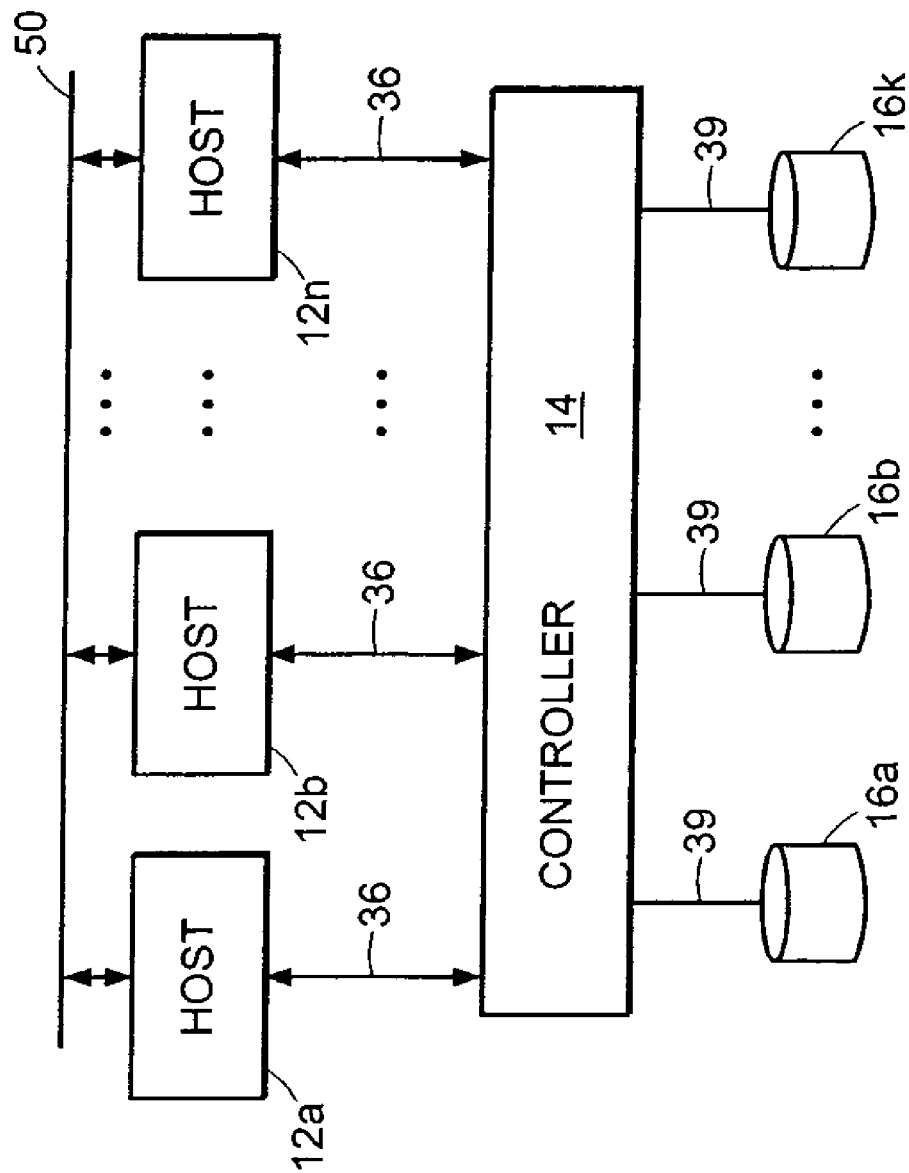
FIG. 1 shows a typical system in which the invention is useful.

Referring to FIG. 1, the invention relates to a computer system wherein a plurality of host computers or processors 12a, 12b, ..., 12n, connect to a storage controller system 14, such as the EMC Symmetrix® storage system. The controller acts as an intelligent interface between the host computers and a plurality of mass storage devices, such as, for example, disk drive elements 16a, 16b, ..., 16k. Data written by the host or read from the disk drive elements passes through the memory controller system which acts as a two way communications path with substantial capabilities. The disk drive elements can have any of, or a combination of, a plurality of configurations. For example, in some systems, the data from a host is uniformly striped across all of the disk storage devices; and in other systems, the data from a host is stored on the disk drives 16 according to a RAID protocol or an n-way mirrored protocol. In yet other embodiments of the invention, all of the data from a particular host may be stored in a logical volume on a single disk drive or allocated to different logical volumes of the same or different disk drives, depending upon the nature and the source of the data and host. A host computer can also read data from one or more of the disk drive units to generate a single host logical volume.

To determine the limits of performance in the system, the hosts can, according to the invention, be operated to exercise and test the memory controller and the disk drive elements. Thus potential problems which can create a bottleneck on those communication lines connected from the disk drive controller to either the disk drive elements or the hosts can be identified, as can cache memory loading issues in the drive controller.

Figure 2:
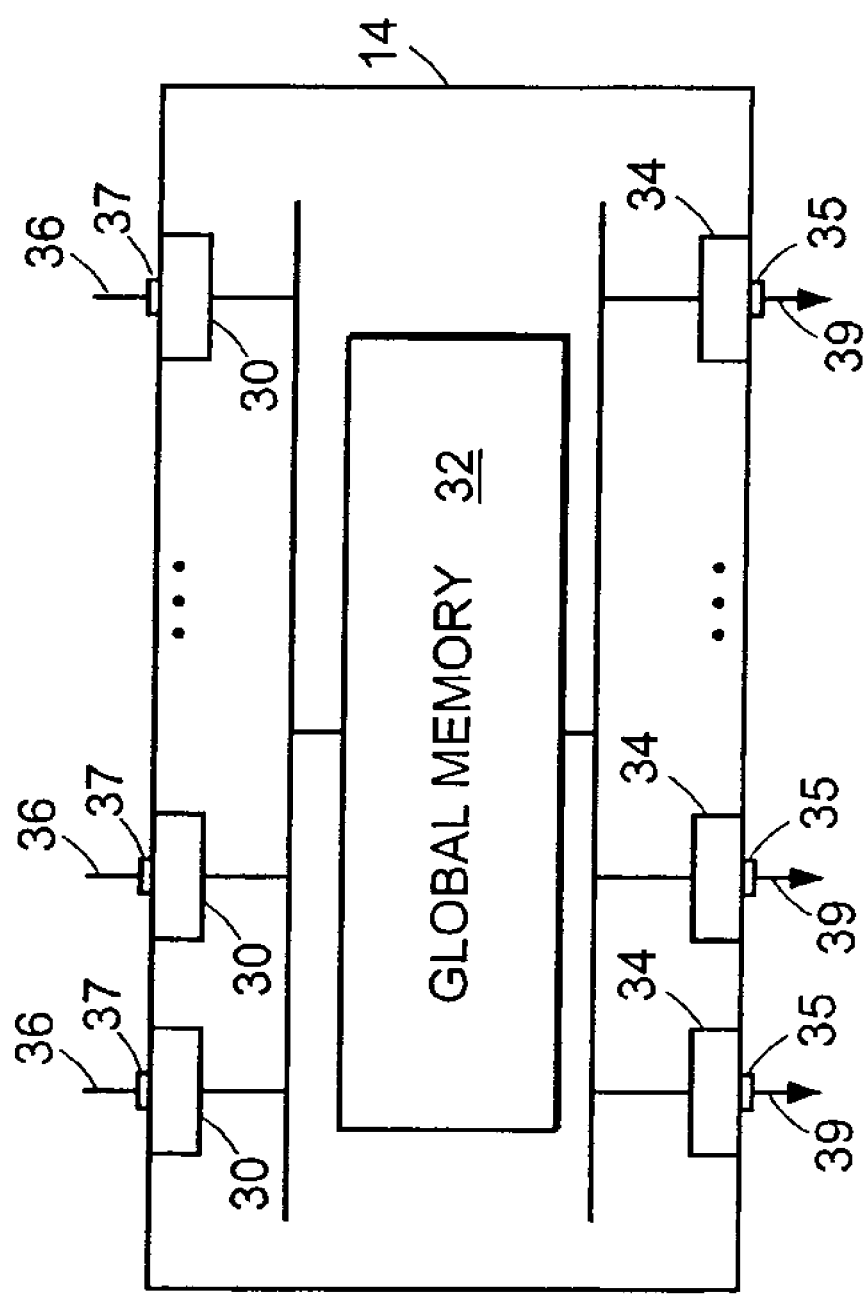
FIG. 2 shows, in more detail, a particular controller system in which the invention finds particular use.

Referring to FIG. 2, in a particular embodiment according to the invention, the disk controller has a plurality of host adaptors (also referred to as channel directors, FA's or SA's) 30 connecting to a global memory 32 through which, in this embodiment, all data and commands flow. The global memory 32 is connected to a plurality of disk adaptors (also referred to as DA's or disk directors) 34 which connect the disk drives 16 to storage 32 through drive ports 35 of the adaptors 34 over lines 39. In accordance with this particular embodiment of the invention, each host adaptor has a SCSI adaptor embedded therein which communicates with the global memory 32. In the illustrated embodiment, the read and write operations pass through each SCSI adaptor unit 34 and to the disk adaptors to the disk drive elements. Each host adaptor connects to one or more host computers over buses 36 at host processor ports 37 of the host adaptors. The host processors also can communicate with each other, for example over an Ethernet based bus 50 (FIG. 1).

Figure 3:
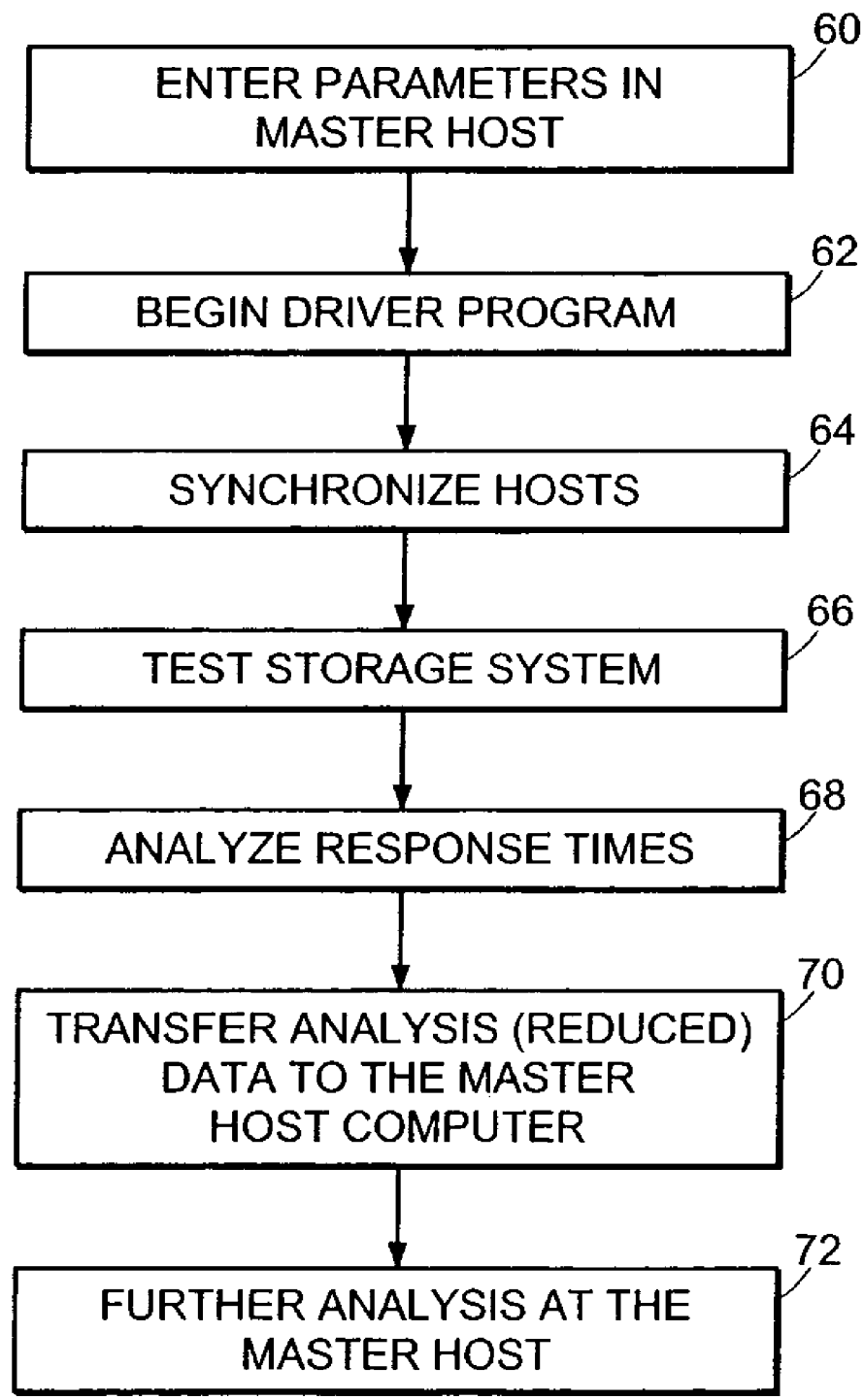
FIG. 3 is a flow chart showing overall operation of the setup/analysis portion of the 30 system.

Referring now to FIG. 3, in general operation, a series of arguments or parameters describing the tests or test to be performed within the mass storage system is entered into a master host processor (step 60). The parameters, represented by the data entered into the master host processor, will define and effectively control the operations by which the hosts gather statistics describing performance of the mass storage system. The arguments or parameter data are entered into a main control program (step 62). Once the parameters are set in the main control program, operation transfers to a main driver program, running on the master host computer. The driver program controls operation not only of the master host computer, but of all of the other (client) host computers as well.

The driver program effects time synchronization of the host computers and causes the next lower level controller programs (the programs which control the commands and data sent to and received from the disk controller), to operate in time synchronization (step 64). In order to achieve both time synchronization of the host computers, and accurate and timely operation of the mass storage system, the driver program may first cause each of the client host computers to synchronize its clock with the master host computer. Further, in response to a communication from the master computer, all host computers begin to issue commands to the controller of the mass storage system, based upon the arguments or parameters previously stored in their memories.

After the necessary test-defining parameters are stored in the memory of each respective host computer, the test is ready to proceed. The next lower level controller program in each of the host computers, designated the scripting program, causes each of the host computers to command the controller in accordance with the command information provided to it by the master host computer driver program (step 66). (Note that the master host computer itself also "receives" such information from the driver program.)

Depending upon the particular disk controller system, one of two possible methods of operation can proceed. If the controller is a "simple" controller, each host computer will itself measure and collect statistics (the raw data) identifying, for example, the response time for each command which it sends to the controller. These response times are collected in a manner which allows the host computer to identify to which command the response time corresponds. Alternatively, for a controller such as the EMC Symmetrix® controller, the controller itself can provide or supplement the raw data for each of the commands which it receives from the hosts. Under this latter circumstance, the controller will return not only the data requested by the command, but in addition, in response to special host requests, the statistics describing the response times for the commands which are being received. That information is provided to the particular host which requested the operation.

Each host computer, then, analyzes the response time data which it either has received or generated itself (step 68). In the illustrated embodiment of the invention, this raw data, which can amount to several gigabytes of information, is analyzed preferably, at each host computer. The analysis is basically a data reduction analysis whereby each host computer, rather than maintaining the full raw data set, operates to reduce the received response times to a smaller set of data. In a first particular embodiment, the data is placed into "buckets", each bucket representing, for example, 0.25 seconds. (In other embodiments, differently sized buckets can be employed). The buckets, however, collectively represent a non-overlapping, continuous sequence of time durations.

In another embodiment of the invention, the response times can be accumulated for a period of time, so that the data returned to the master host computer will represent the cumulative response times for all commands issued during each of a plurality of non-overlapping contiguous larger durations of time, for example 5 or 10 seconds. That is, for each of the contiguous time periods, the response times for each command initiated in the period will be accumulated. This is particularly useful where the tests can run for several hours and in which tens of gigabytes of data will be produced for each of the host computers.

No matter what method is used to collect and/or reduce the data, the master host computer collects the resulting data from each other host computer (step 70). The master host computer, at the driver program level, then can further analyze the reduced data, as described below, to obtain and present statistics to the user (step 72). These additional statistics can provide further insight and understanding into the performance and operation of portions of or the entire of computer/memory system.

Figures 1, 8A:
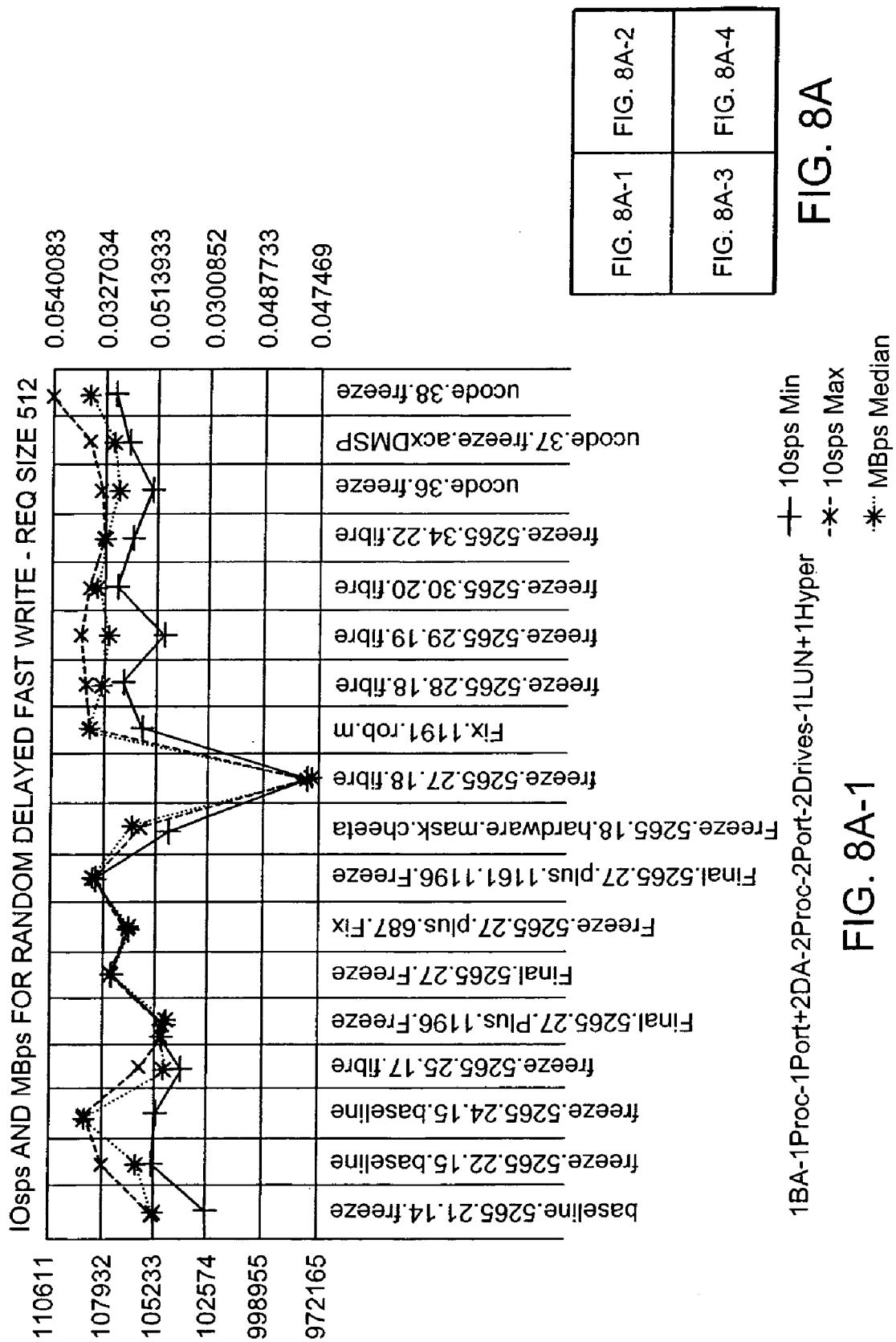
Figures 2, 8A:
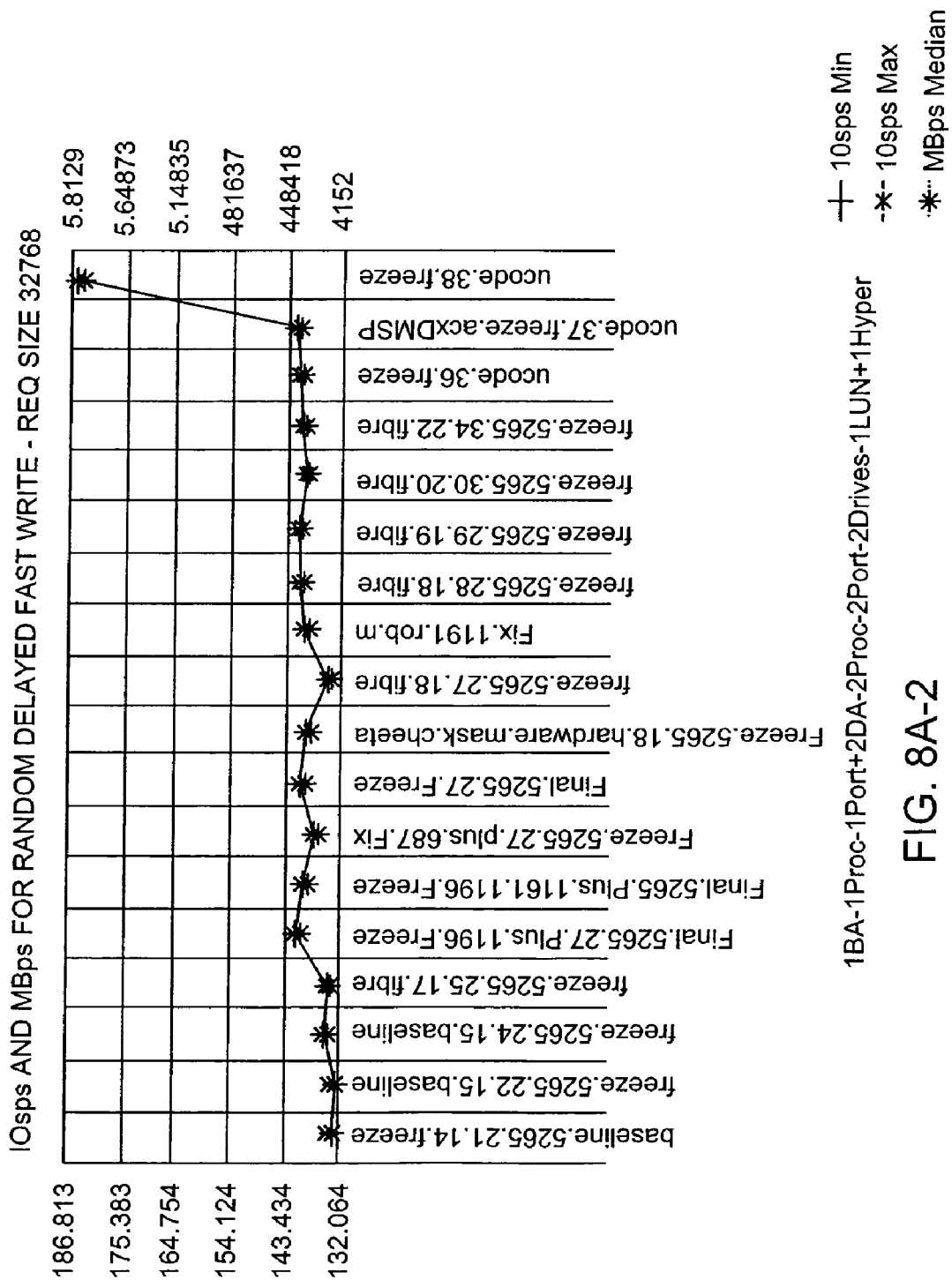
Figures 3, 8A:
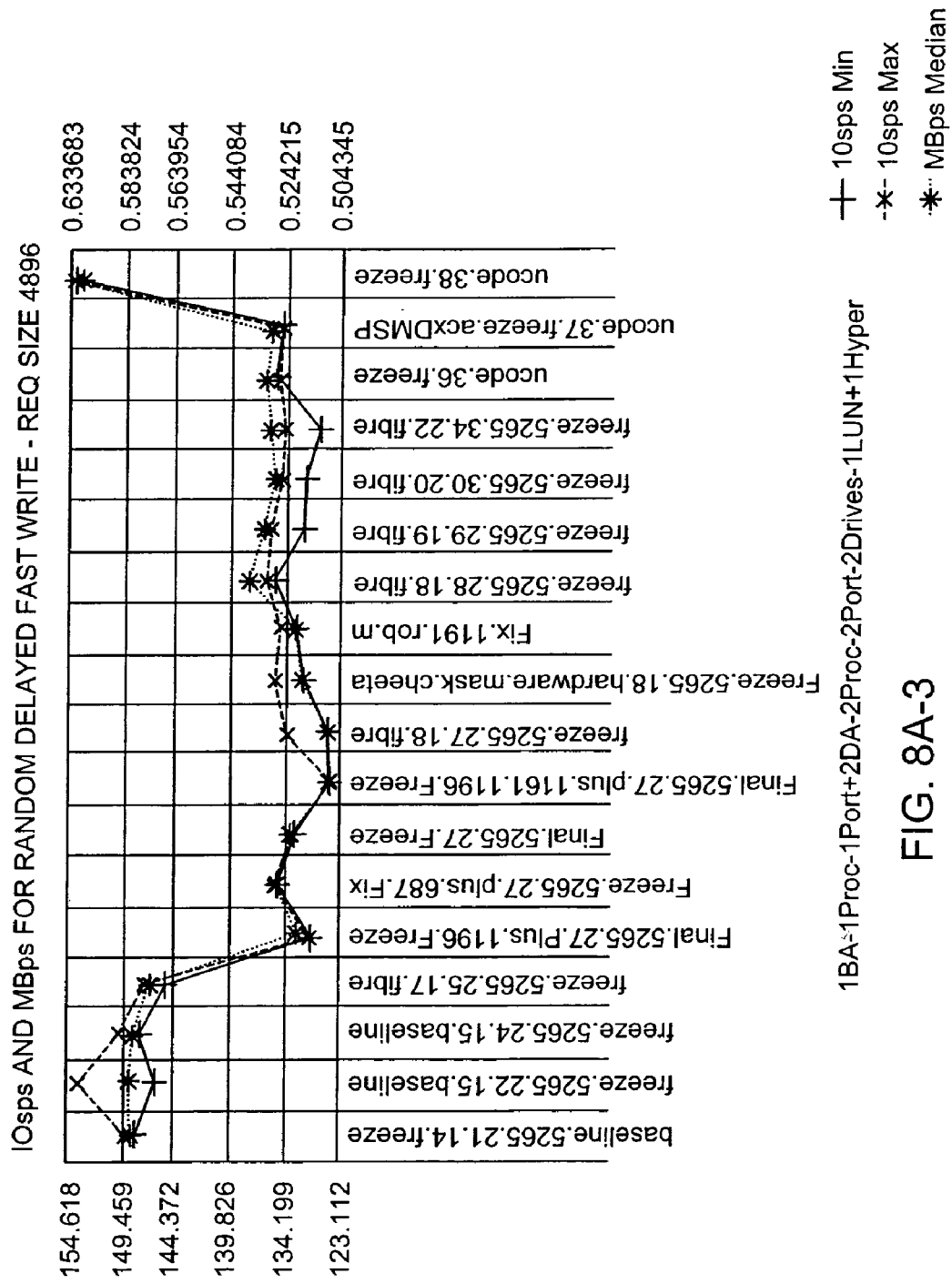
Figures 4, 8A:
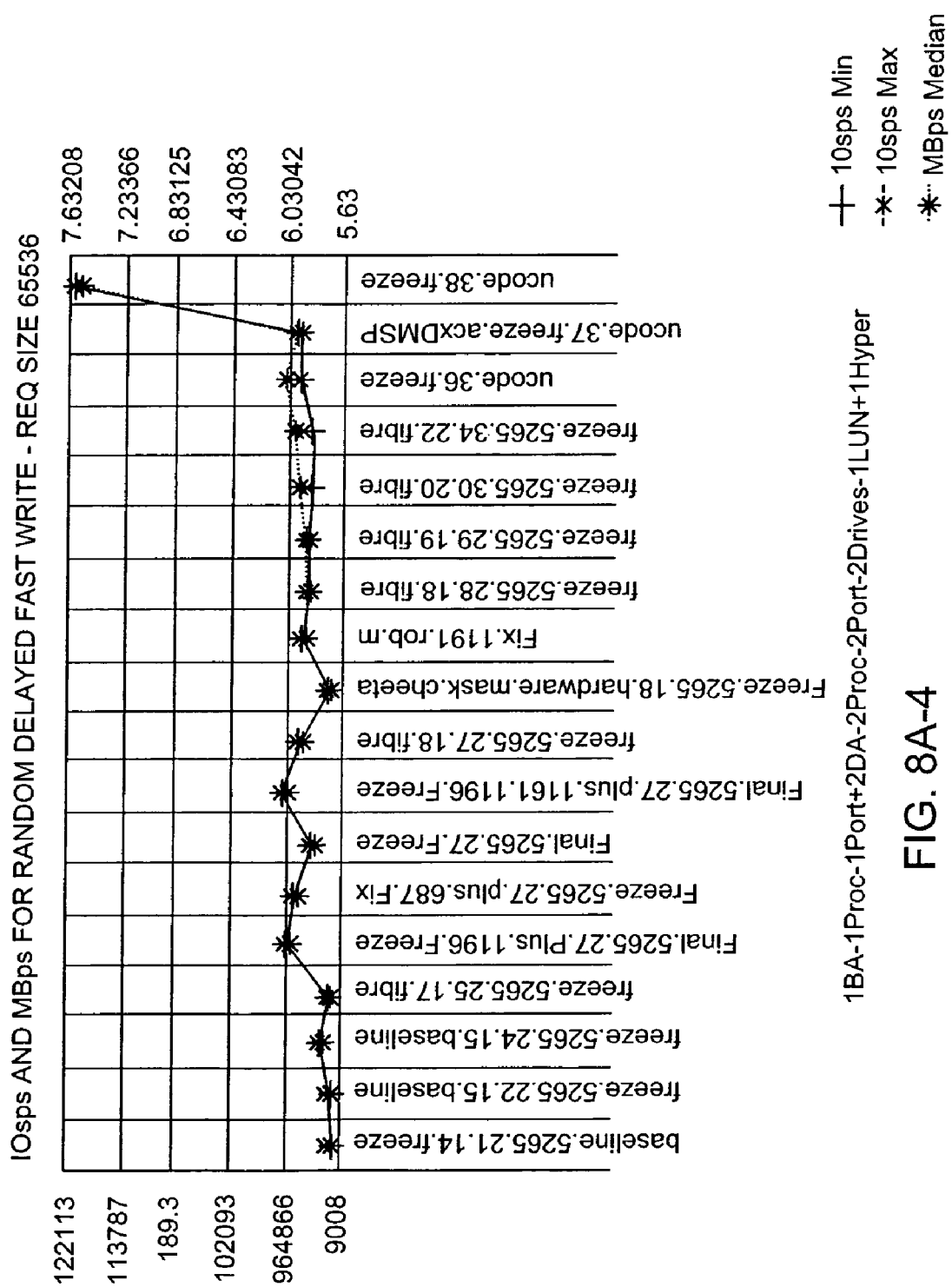
Figures 2, 8B:
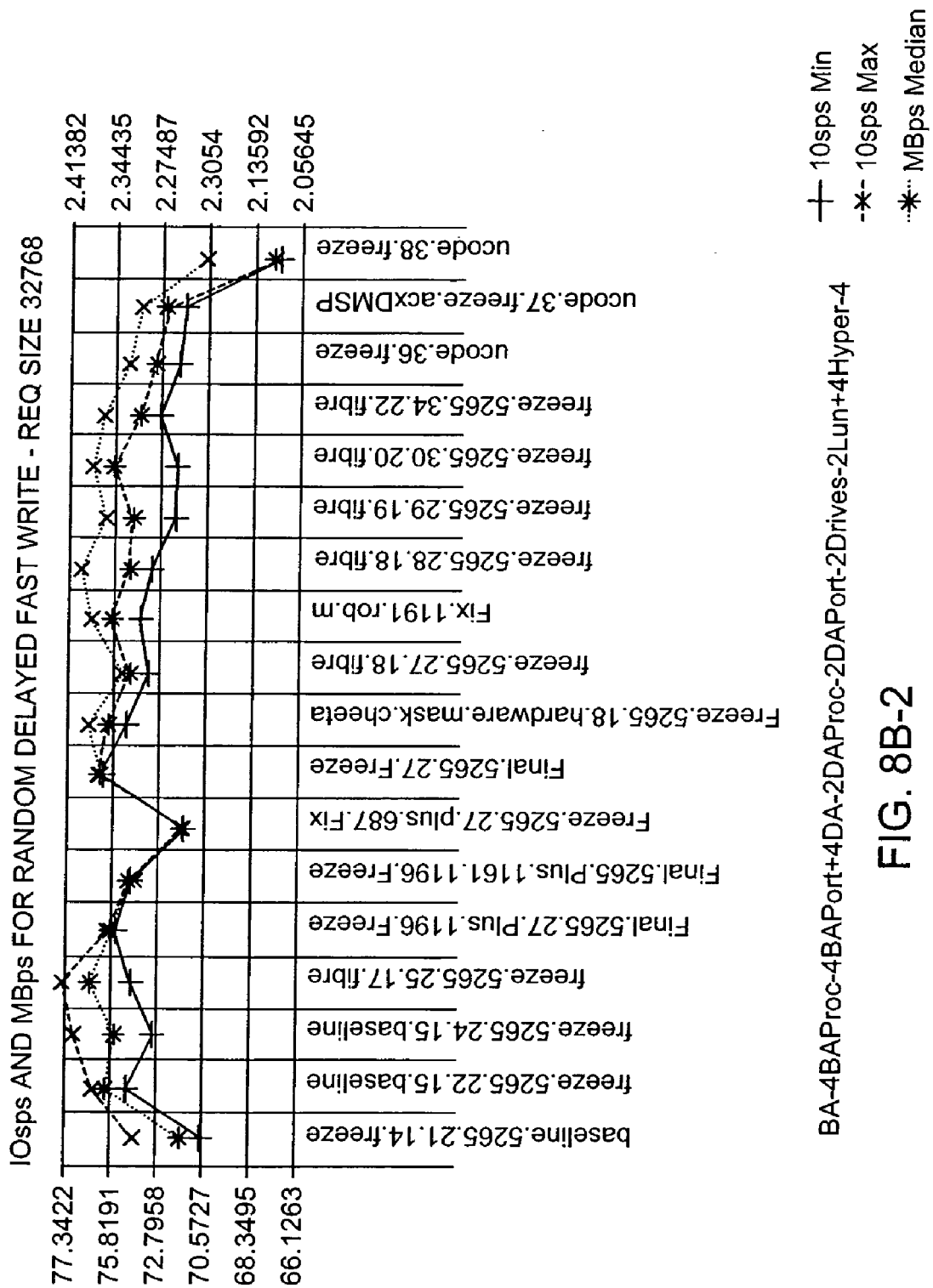
Figures 3, 8B:
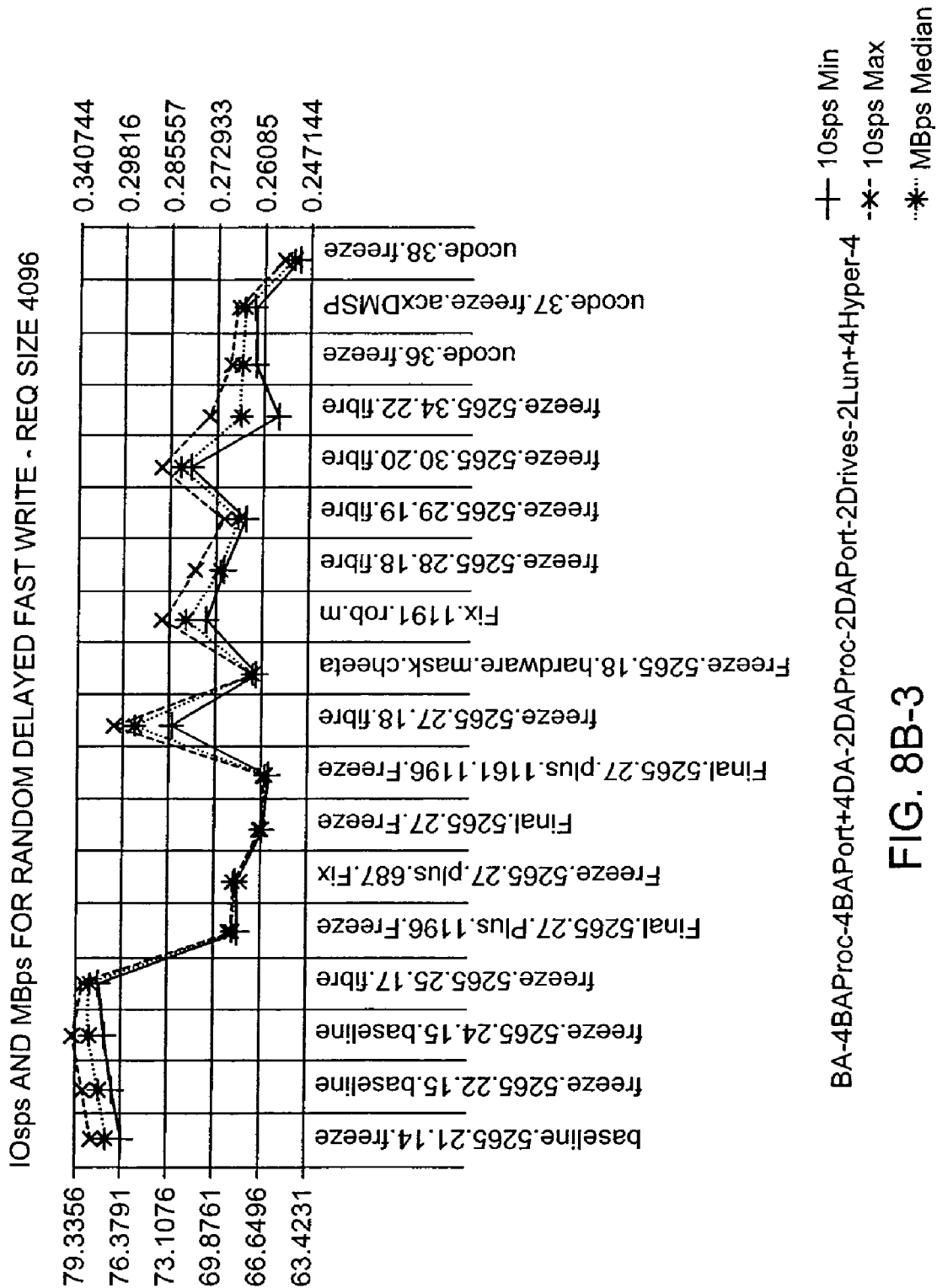
Figures 4, 8B:
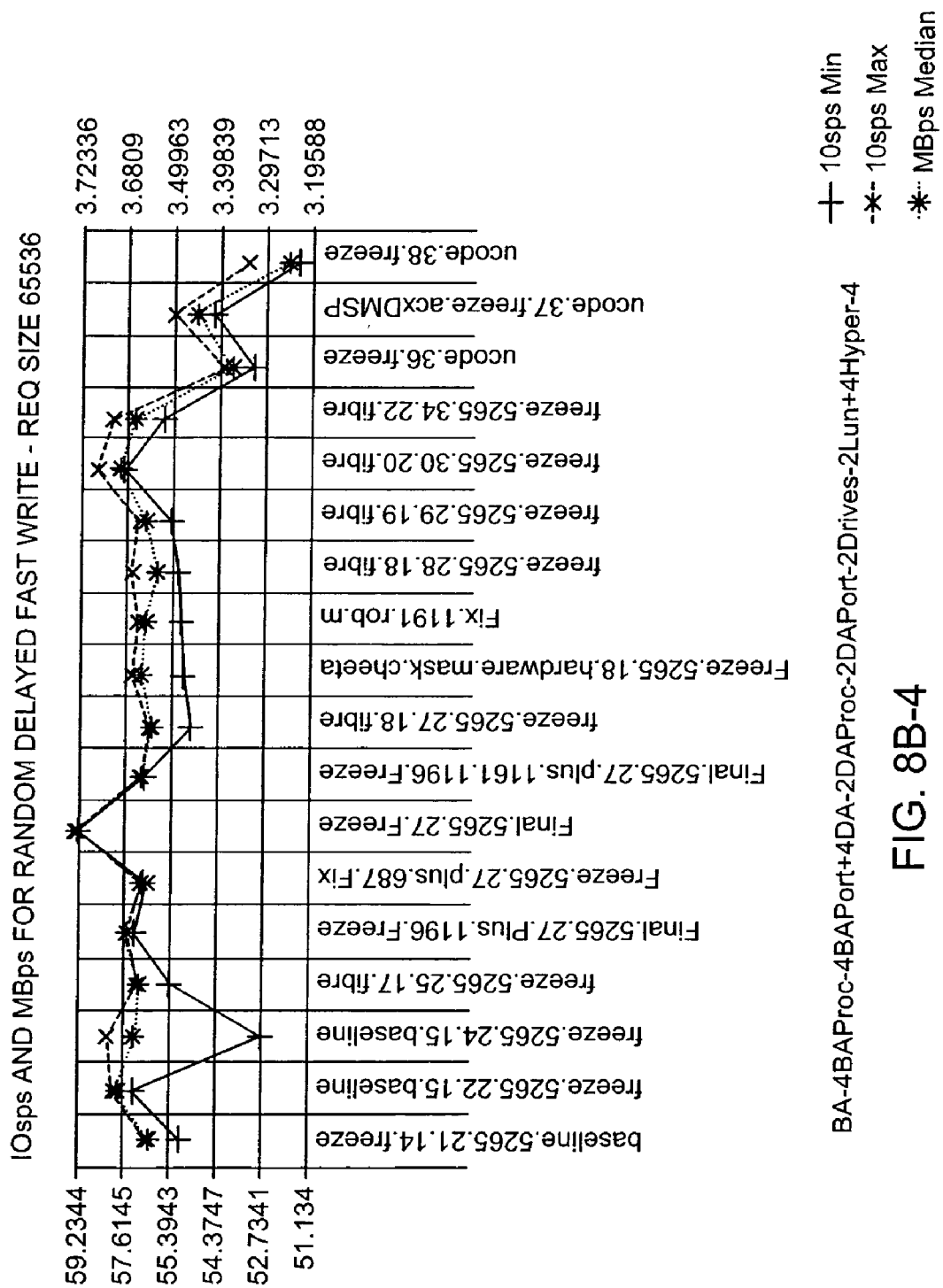
Figures 2, 8C:
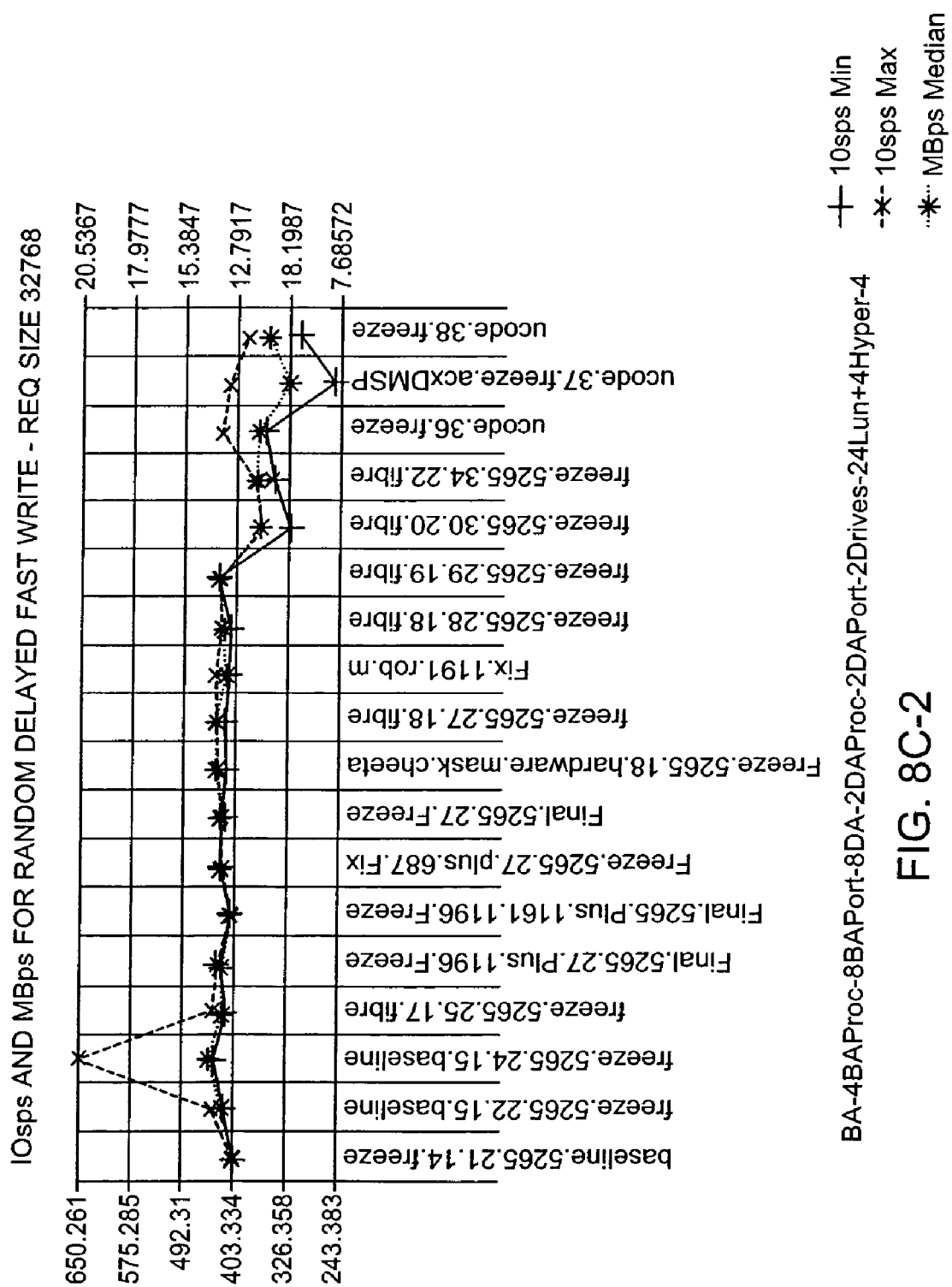
Figures 3, 8C:
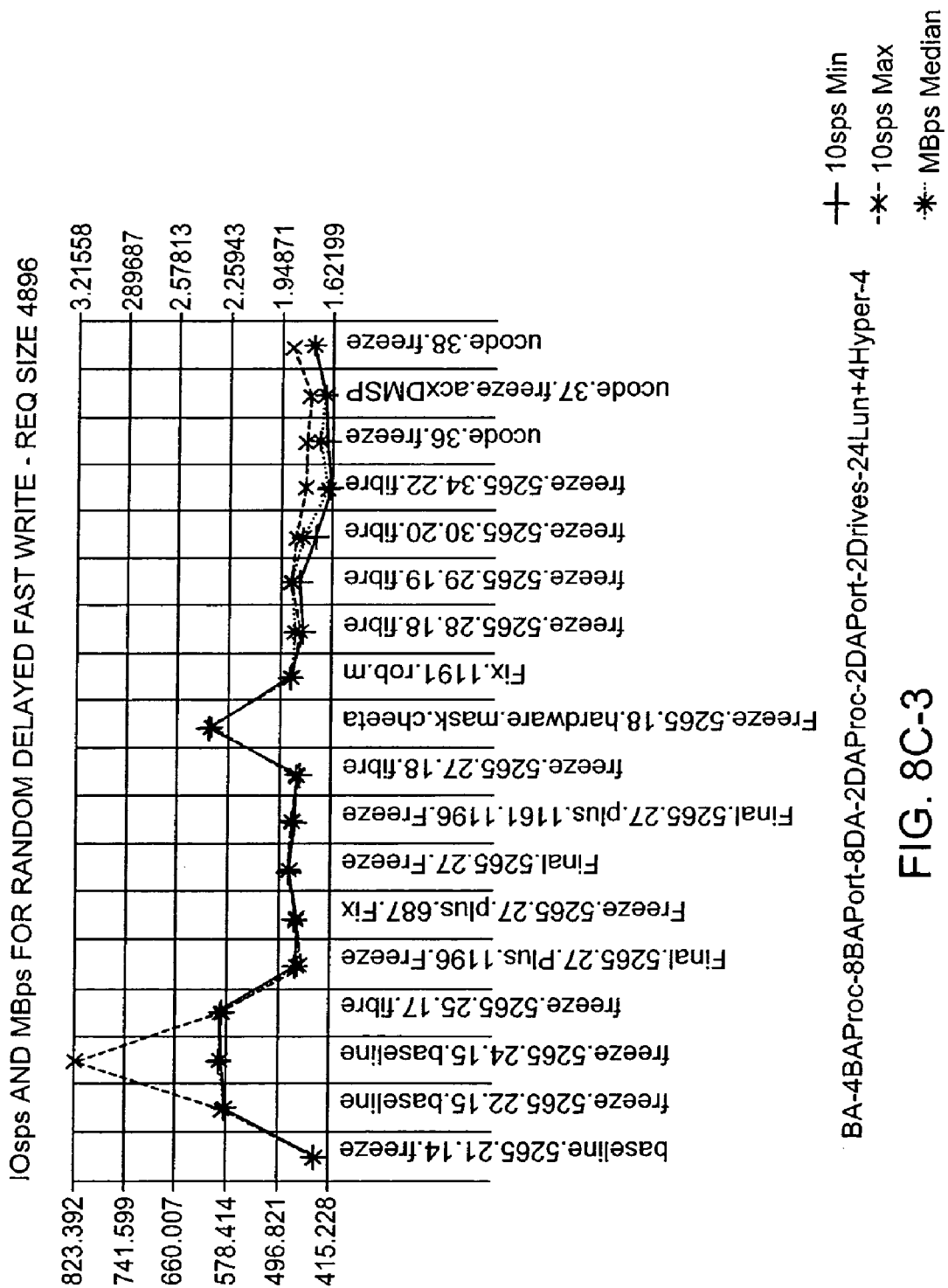
Figures 4, 8C:
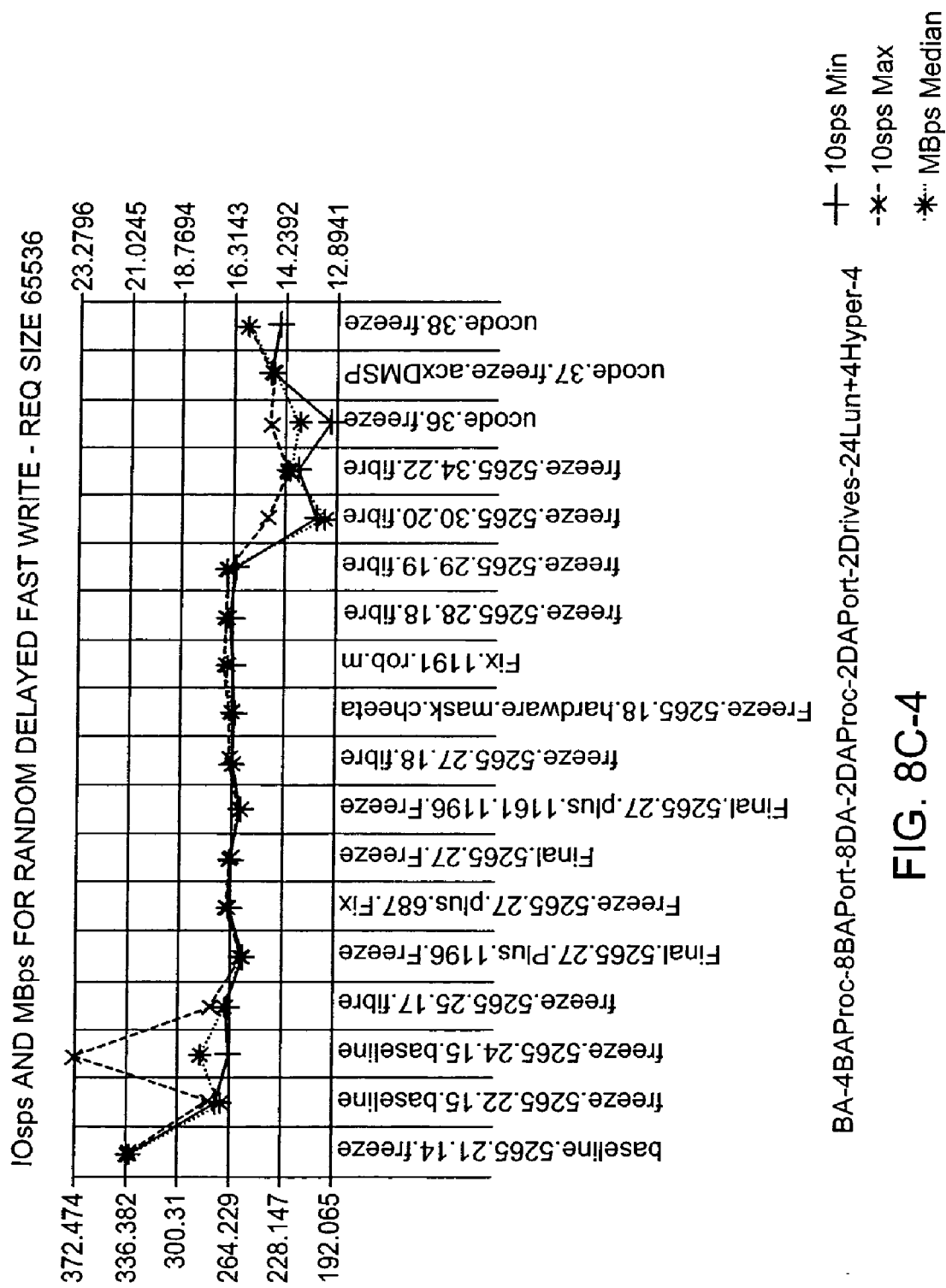
Figures 2, 8D:
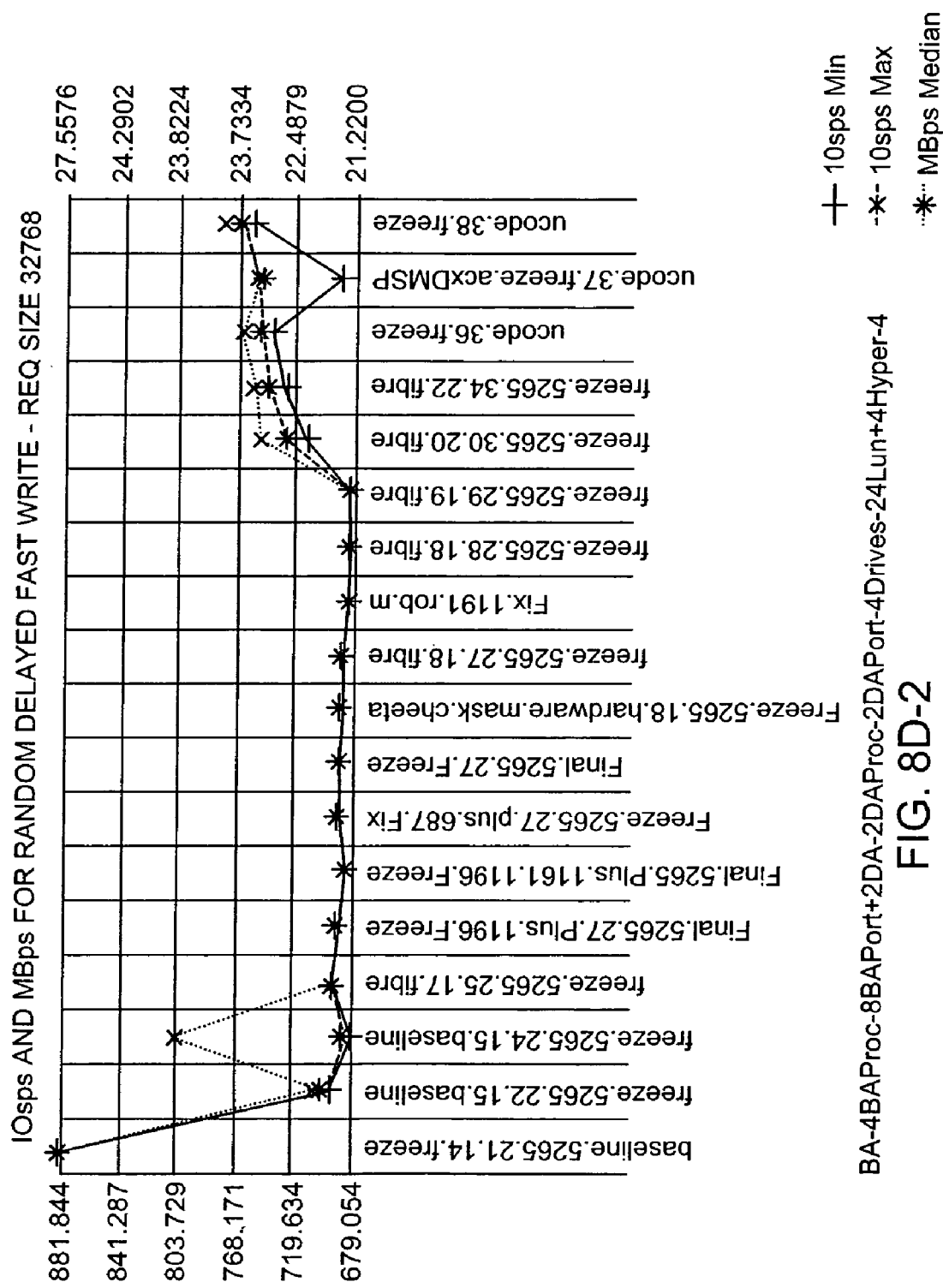
Figures 3, 8D:
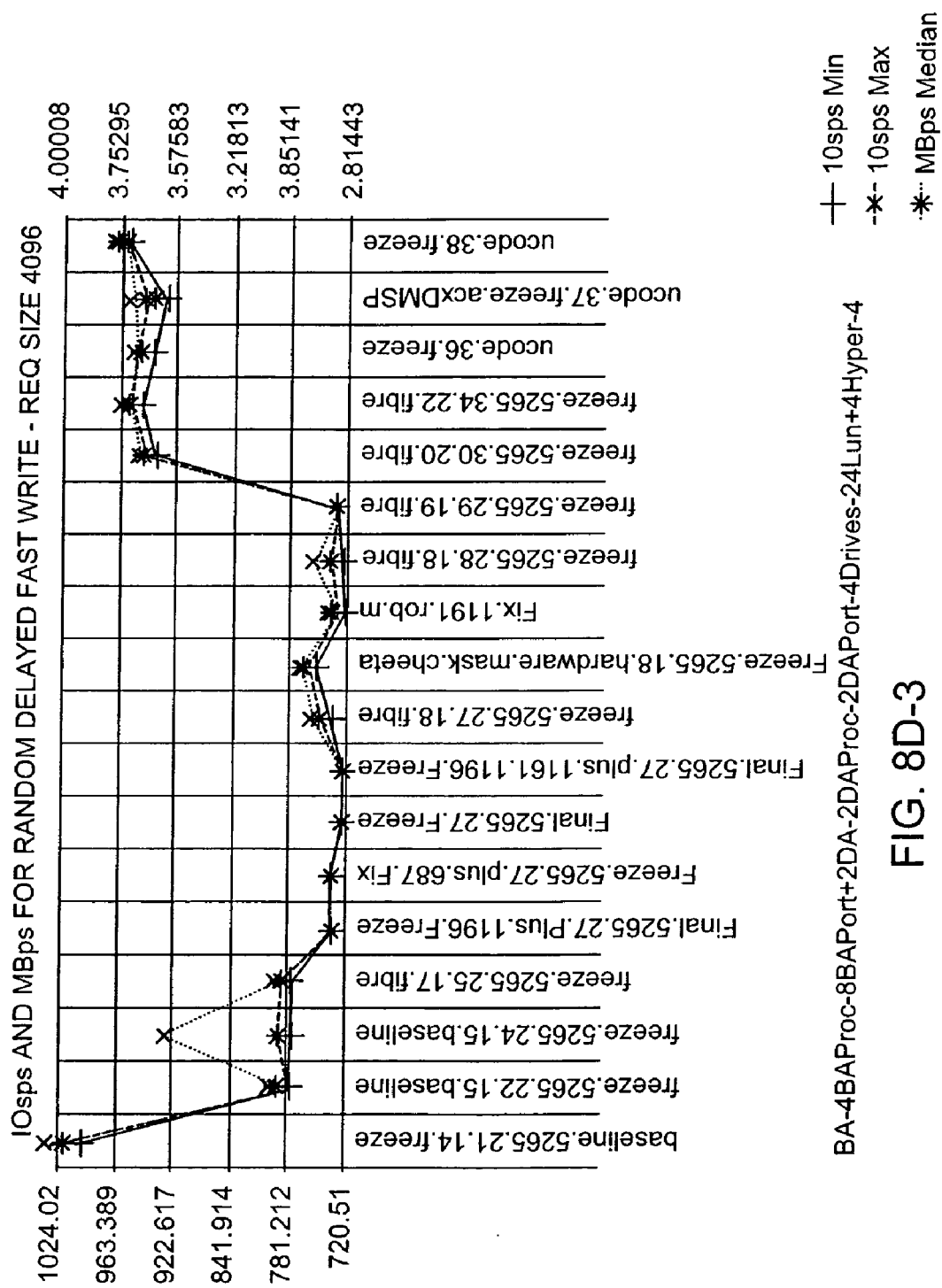
Figures 4, 8D:
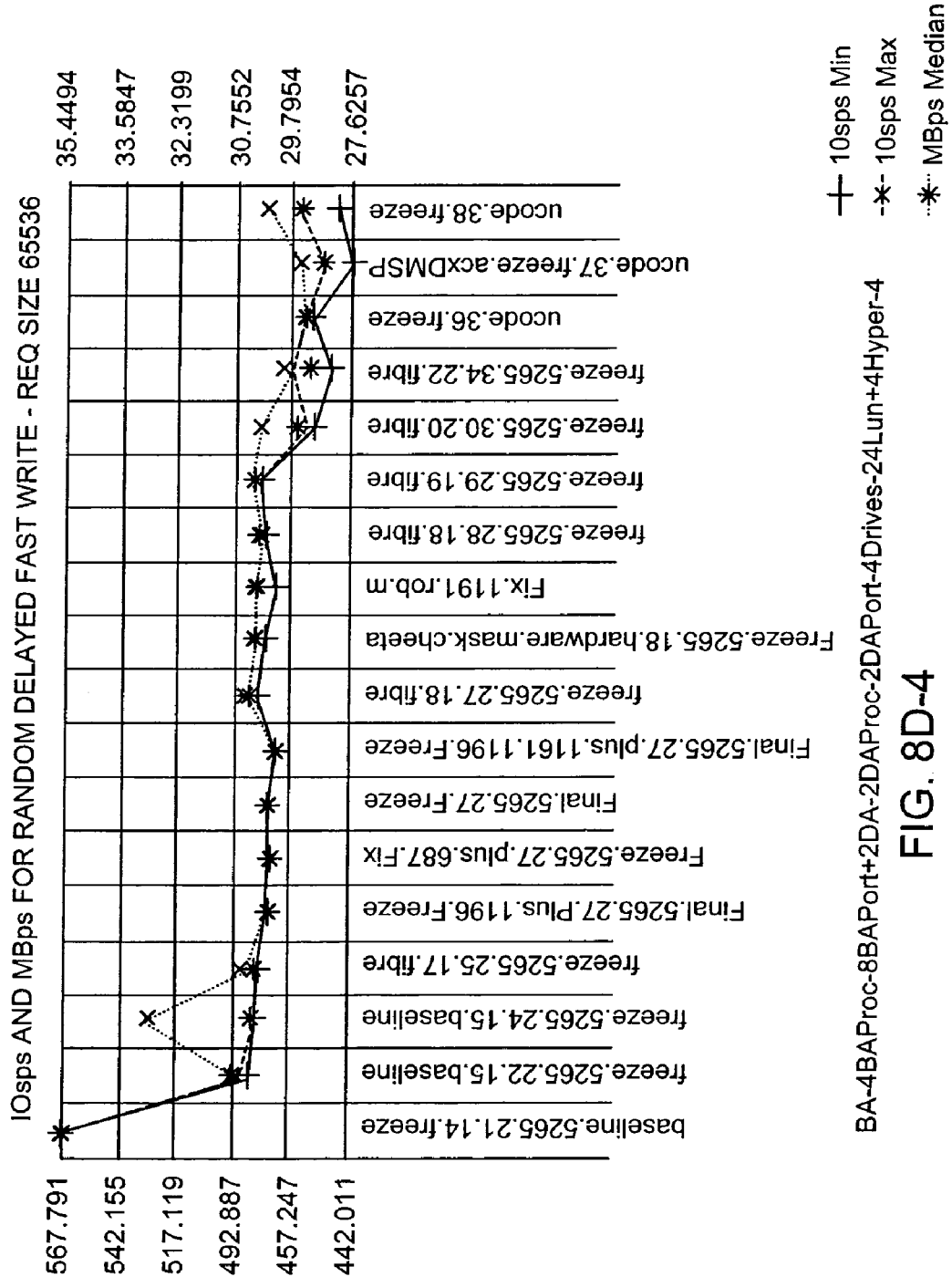

Referring now to the operation of the computer system in more detail, and referring to FIGS. 4A and 4B, at the main program level, in the master host computer, a number of parameters or arguments are entered and recorded using a graphic user interface. These are illustrated in the table of FIGS. 4A and 4B. Turning to the table, the initial parameters include the number of logical disks to be tested, the number of "child" processes to start (as that term is used in the Unix operating system), the number of processes that capture response times, the number of response times to collect, the buffer size requested, and the offset size, in bytes, rounded down from a randomly generated number (this supports seeks on random reads and writes to even boundaries of stripes). Other required arguments include the maximum range in megabytes to span the device, the time in seconds to effect read or write operations or the amount of data in actual bytes to read and write, and the percent of operations which will be read operations (with the remainder being write operations). Other optional arguments, in the illustrated embodiment, include identification of the devices to test, identification of which host will be the master host computer and whether the I/O operations will be sequential or random. Other optional arguments include the number of sequential I/O operations to perform, once the system has "seeked" to the correct offset for a random operation, and the displacement in bytes back from that particular offset. In this particular embodiment of the invention, there are the yet further optional arguments which include the amount of time to delay between I/O commands, the initial byte offset to start sequential read or write commands, the method in which response start times will be collected (for example the use of buckets), a parameter identifying a percent hit rate to be implemented in connection with Integrated Cache Disk Arrays (ICDA's), including Intelligent Storage. Systems, with controller cache to read or write a specific number of megabytes of data, and a random range multiplier (for devices larger than the scope of the random number generator).

Figure 5:
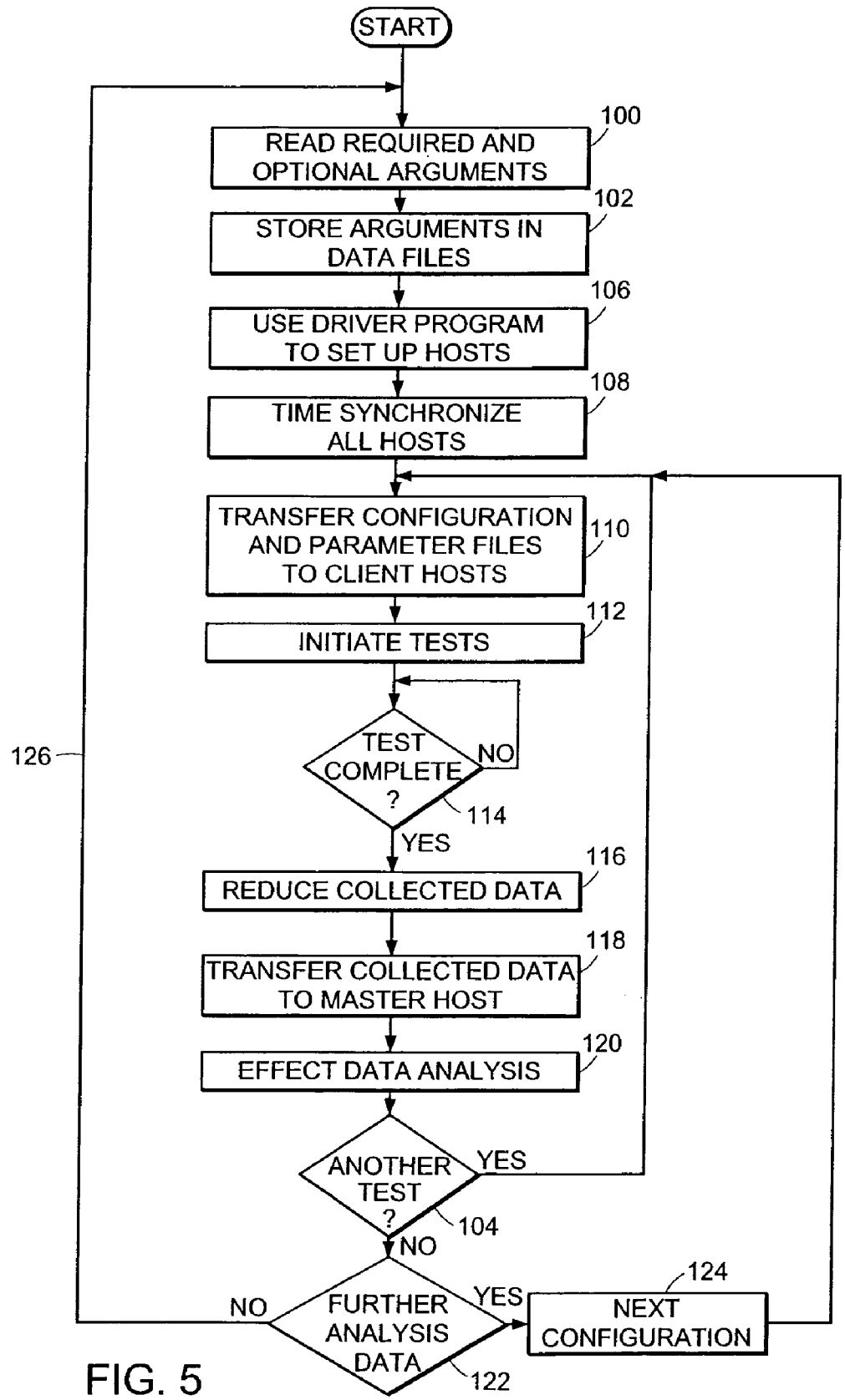
FIG. 5 shows a more detailed flow chart in accordance with the operation of the system.

Referring now to FIG. 5, the operation of the system, in accordance with the invention, can be viewed as a series of nested loops, the outer most loop being the main program, the next loop being the driver program, and the inner loop being the scripting 10 program. In the outer loop, the system receives the arguments or parameters which control or set up the operation of the test program. Those parameters or arguments have been described above in connection with the table of FIGS. 4A and 4B. Referring to FIG. 5, the main program receives (at step 100) and enters (at step 102) the various arguments in its data files. In a preferred embodiment of the invention, each test is performed typically three times (tested at step 104) to ensure a statistical averaging which creates both confidence and accuracy, thereby avoiding variability and statistical anomalies. A test may also be performed once for verification purposes (and with less data).

Once the arguments have been stored in the data files on that host computer, which is designated as the master computer, the main program invokes the driver program, running on the master computer, to set up all of the hosts. This is indicated at step 106. The driver program, in response to the arguments provided, will initialize the cache memory, if necessary, and will initialize as well, all of the host computers, including the master host computer. The driver program, at 108, causes all of the host computers to be time synchronized. (If time synchronized, it may perform this function by sending to each of the client host computers over channel 50, the clock time of the master host computer.) Each client host computer now runs the scripting program in response to initialization by the driver program and communications from that program over communications channel 50, linking all of the host computers. (Thus all of the client host computer clocks may then be set in some embodiments of the invention, with the result that all of the host computers participating in the test are operating with time synchronized clocks.)

The driver program then transfers to each of the client host computers the necessary configuration and parameter files with which the scripting program, at the client host computers and at the master host computer, will operate to test the mass storage system. This is indicated at step 110.

Next, the driver program initiates testing of the mass storage system by communicating to each host computer, directly from the master host computer and over the interconnecting communications channel 50. As a result, each host computer begins sending commands and data to and receives at least data from the mass storage system at the same time. At this point, it is the configuration and parameter input to the master host computer, as delivered to the client computers, which controls the actions of each of the client host computers. Thus, the provided information and arguments can cause, for example, only a subset of the host computers to communicate and issue commands to the mass storage system, and/or only a specific set of logical units at the mass storage level may be exercised in a specific configuration dictated by the arguments input at step 100.

The scripting program, when a test is complete, as tested at 114, then reduces the data which it has collected (step 116). As noted above, the data reduction process, if one is used, can use either a bucket compression or an accumulation compression approach. (The approach can be dynamically changed during the test sequence by, for example, a user command to the master host computer.) Alternatively, the initial raw data may be maintained in its original form. The raw data can include, for example, the response times to read and/or write operations, which have been commanded in accordance with the input parameters. (In accordance with the invention, when there is a mix of read and write commands, the system first issues a block of one set of the commands and then a block of the other set of commands. For example, when there are to be 40% read commands, the system can issue three write commands, followed by two read commands, followed by three write commands, etc. In this manner, the associated statistical data which is collected can be directly correlated to a particular read or write command.)

Once the data is in its final (and most likely, reduced) form at the client host computers, it is transferred over channel 50 to the master host computer. This is indicated at step 118. Thereafter the master host computer can effect a more comprehensive data analysis, at step 120, to determine the performance of the mass storage system, for example, the number of I/O's, and in particular, the number of writes, as a function of time. The driver program then determines whether another test is to be performed, at step 104, and if not, the driver checks to determine whether further analysis of the data is to be performed (at step 122). If further analysis data is to be collected using a new configuration, the new configuration is generated at step 124, and the process begins again starting with step 110. If no further analysis data is needed, the system returns to the beginning of the process as indicated by loop 126. In this manner, the three nested loops of this preferred particular embodiment, loops represented by the main program, the driver program, and the scripting program, can provide effective and dynamic testing of the storage system to determine its performance under a large variety of situations.

Figure 6:
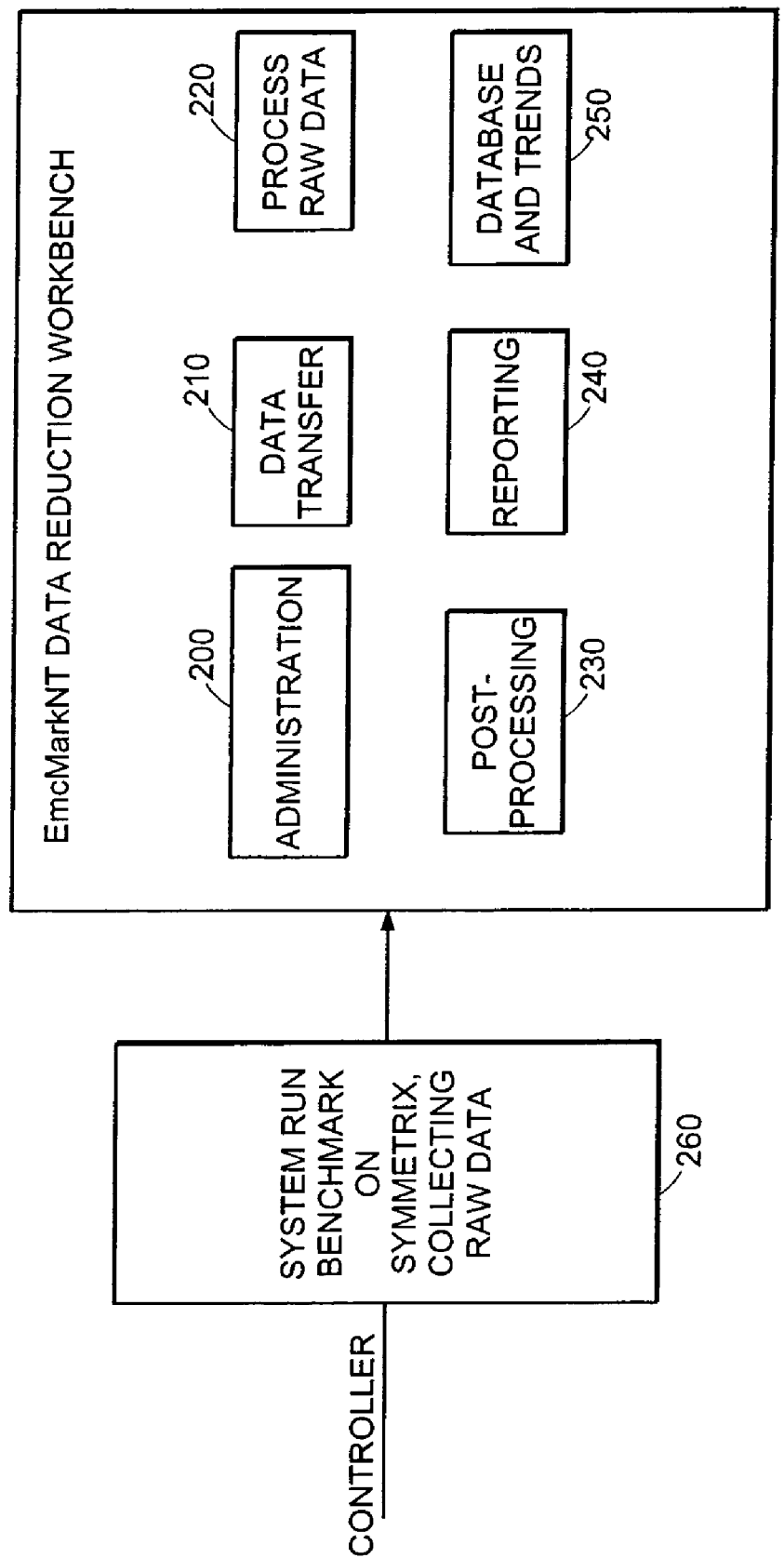
FIG. 6 shows the operational subsystems of the system.
Figure 7:
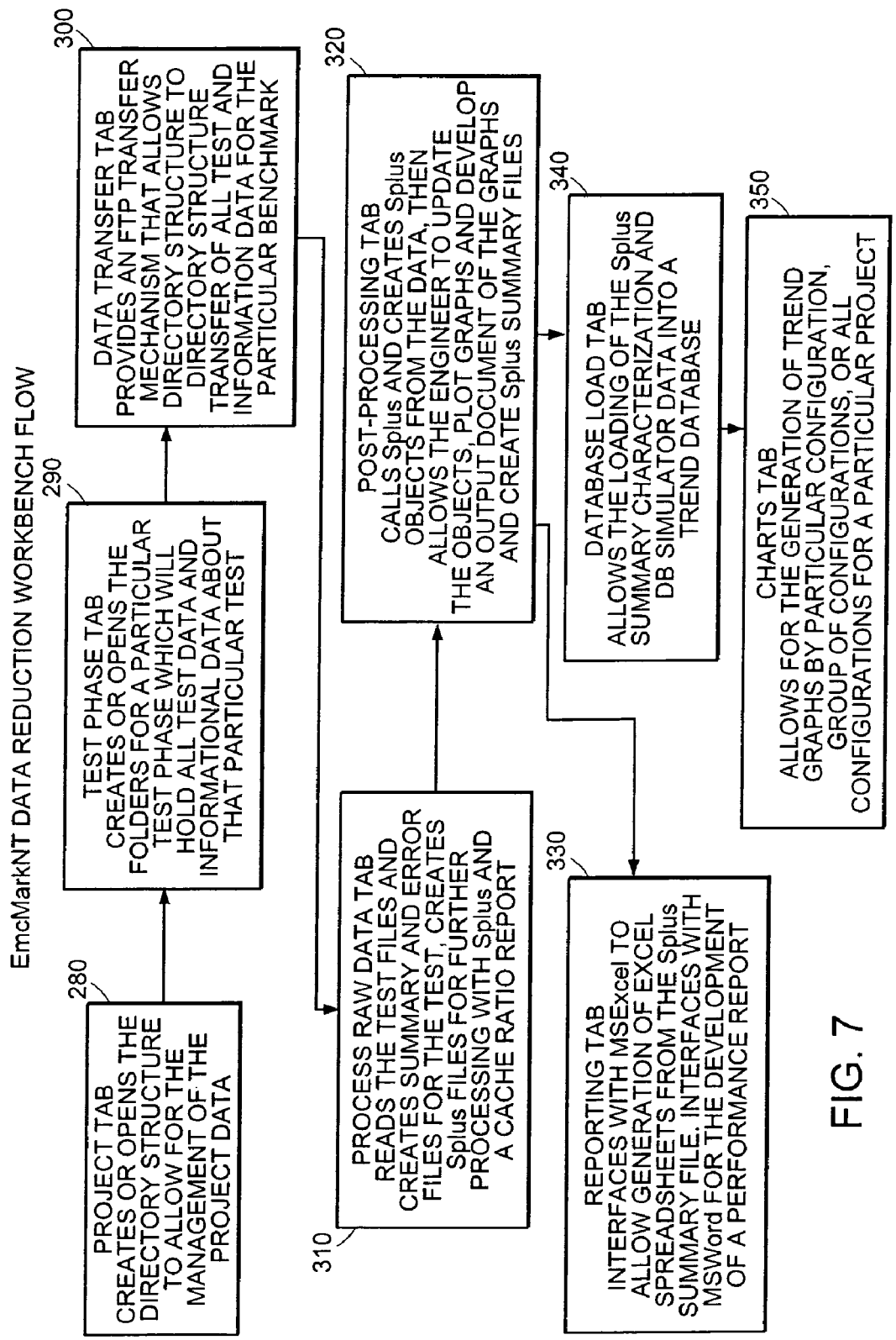
FIG. 7 shows data reduction sequential flow.

Referring to FIG. 6, in accordance with the operation of the system, there are provided, generally, six operational subsystems. These are designated administrative 200, data transfer 210, processing of raw data 220, post processing of raw data 230, reporting 240, and database and trend analysis 250. These elements of operation are initiated, by the user, in a sequential manner as noted in FIG. 7, after the system for collecting the raw data (on the disk controller) is initiated at 260.

The data reduction workbench system of the invention begins with a "project tab" which creates or opens a directory structure to allow for management of the project data. This function organizes the data reduction workbench and allows creation and management of new, or the opening of existing, projects and test phases, and further insures consistent naming of all of the components within a project. It also logs all operations performed at both a project and a test phase level. At the test phase level, the system creates or opens the folders for a particular test phase which will hold all of the test data and informational data regarding that particular test. Each test is identified, at 290, and the organization process to effect data transfer begins. Next, in the data transfer phase, at 300, a file transfer protocol is incorporated for transferring the data from the test environment (either the host computers or the disk controller system, such as the EMC Symmetrix® controller system). This mechanism provides the directory structure of all test data and information data for the particular test (benchmark) which has been run.

Once the data has been transferred and is ready to be processed, the system processes the raw data, at 310, by reading the test files and creating summaries and error files for the test. The processing of raw data further creates statistical analysis program files, for example, for further processing and a cache ratio report to ensure that the actual cache ratio is within an acceptable margin of the targeted cache ratio for the characterization workload test. The data is also checked for errors at this stage and those errors are reported, and in some instances, corrected. The coalesced data is then formatted for input to the post processing stage at 320. The coalesced data results from processing the raw data, by automatically processing characterization and database simulation benchmark data, as well as controller generated internal data, and coalescing, according to the test, test iteration, and test configuration, the data collected by each host operating in the test. The coalesced data is thus provided in a single data file for the following post processing.

The post processing phase 320 provides an interface to the statistical analysis data processing program, and to other analysis tools such as the Write Analysis Tool described in U.S. application Ser. No. 09/542,463 entitled BENCHMARK TOOL WRITE ANAYSIS FOR A MASS STORAGE SYSTEM, and filed Apr. 4, 2000, and incorporated herein in its entirety by reference, and allows for plot generation, data summarization, and the importing of the test and information data for a particular test, using a graphical user interface. As a result, formal plot presentations can be automatically loaded into an electronic document, for presentation in a standardized format.

Once post processing has been completed, the system provides interfaces to other presentation formats to generate spreadsheets from the statistical analysis program summary files created during post processing to enable charts and tables to be created in, for example, a standardized word processing report. This enables the development of performance reports. This is indicated at 330. In addition to the reports, this system also automatically loads the benchmark statistical analysis summary data into a database (at 340). With the data thus available, a trend analysis can be created and displayed according to the test types and system configurations. This is indicated at 350. This enables the comparison of performance behaviors across multiple projects (that is, as a function of time) and test phases (for example as a result of different operating software for the same configuration of equipment) in order to determine visually, at first impression, trends which may affect the analysis of system performance.

Post Processing

Once the data is collected, according to the invention, the system organizes, validates, checks, and presents the data as noted below. In the raw data post processing and correction stage, the validity checks can include checking individual data points for errors and applying predetermined decision criteria to either correct, ignore, or delete erroneous data. In addition, an overall validity comparison of the actual (and corrected) results with expected results based on the I/O configuration profile can be effected. The user of pre-established criteria to decide whether to correct, ignore or use the erroneous data is implemented in accordance with one embodiment of the invention by flagging any inconsistencies based on expected results of a particular input/output type and storing such flagged data in a system data files. Once the corrections have been effected, the revised data can be put into any of a number of industry standard templates.

Figure 9:
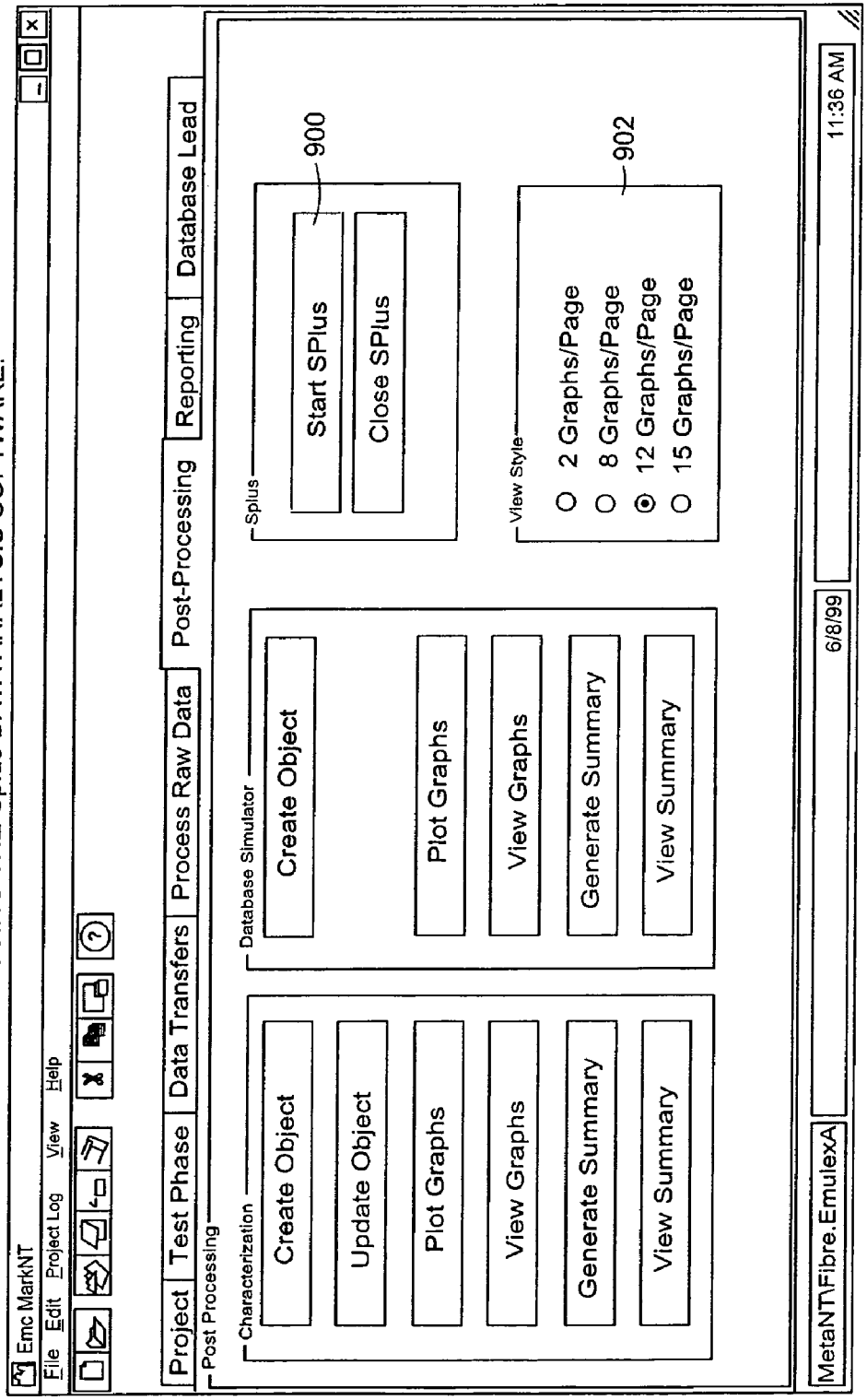
FIG. 9 shows screen shots of the graphical user interface of the system for post test data processing.

Referring to FIG. 9, a post processing "tab" enables the user to first start a statistical analysis program by clicking on button 900. The user can then bring up the statistical analysis program window to watch, on screen, for errors and to use it during any update-objects-routine which may follow. The user then selects the number of graphs per page as indicated at 902 (in FIGS. 8A1–8A4, 8B1–8B4, . . . one graph per page has been selected) and thereafter can select processing of the data as described above.

Figure 10:
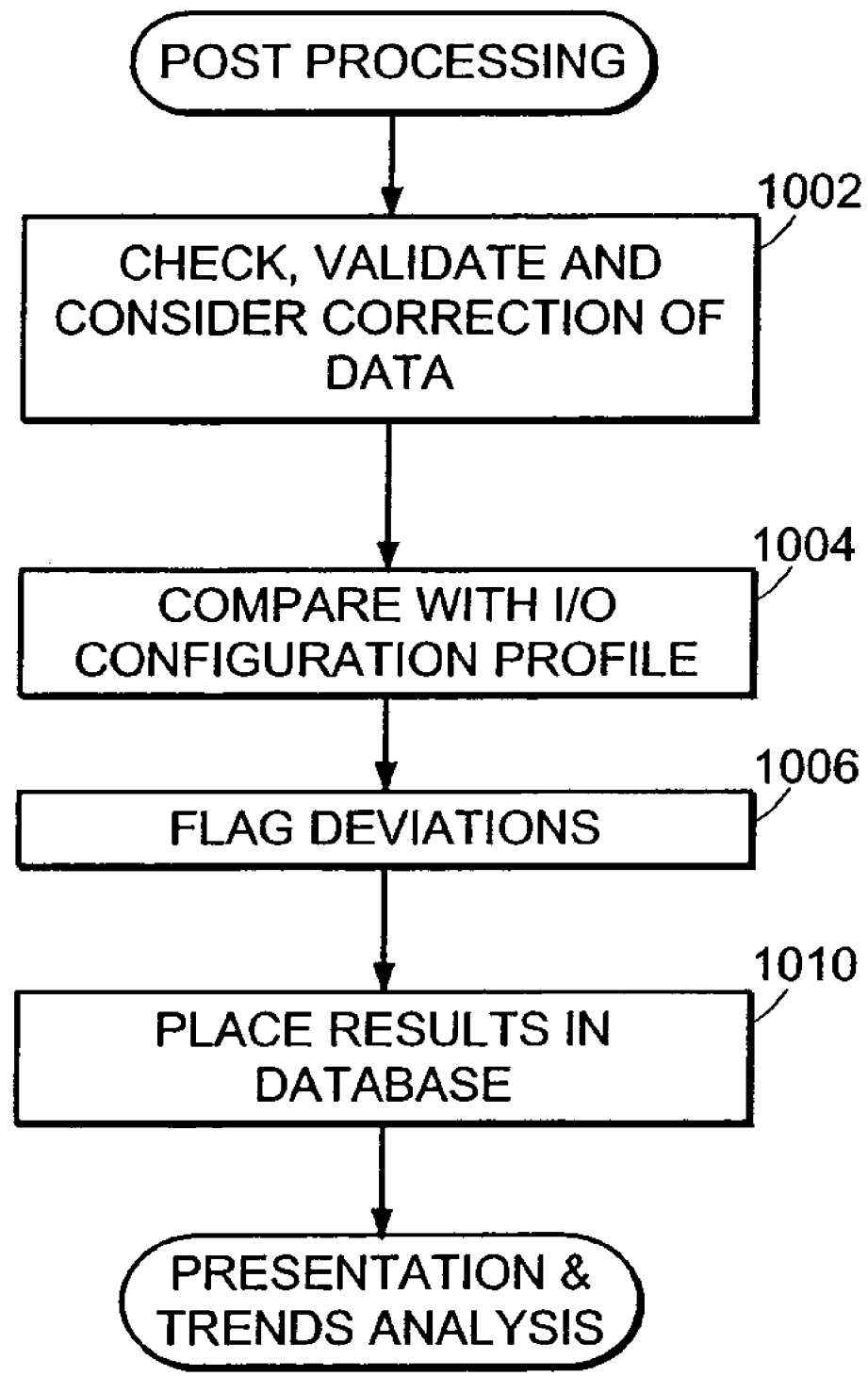
FIG. 10 shows a flow chart illustrating post processing.
Figure 10A:
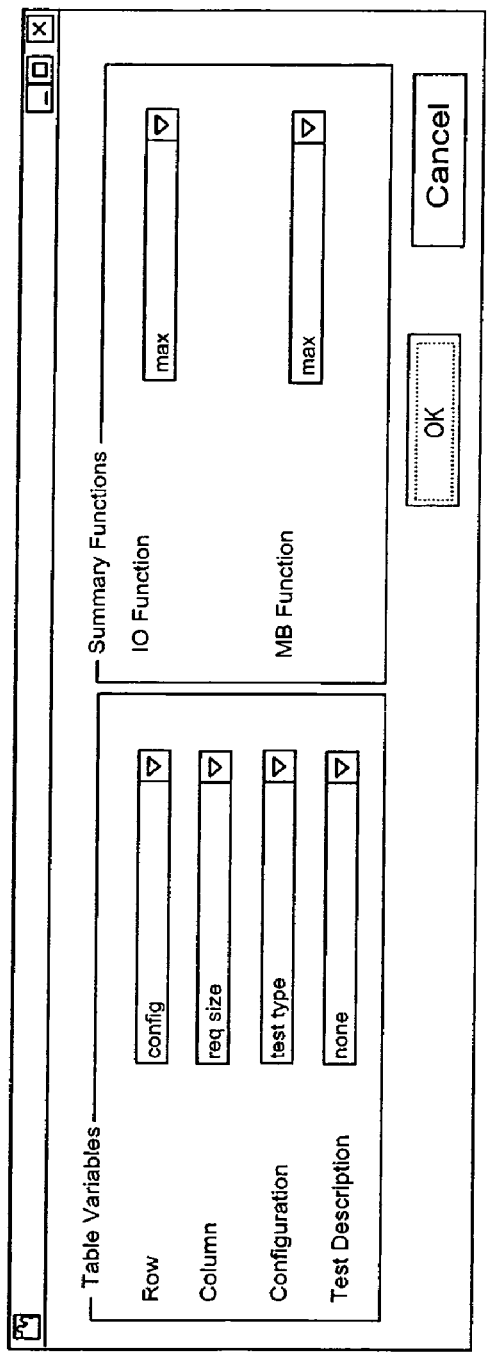
FIGS. 10A–10B show screen shots of the post processing presentation.
Figure 10B:
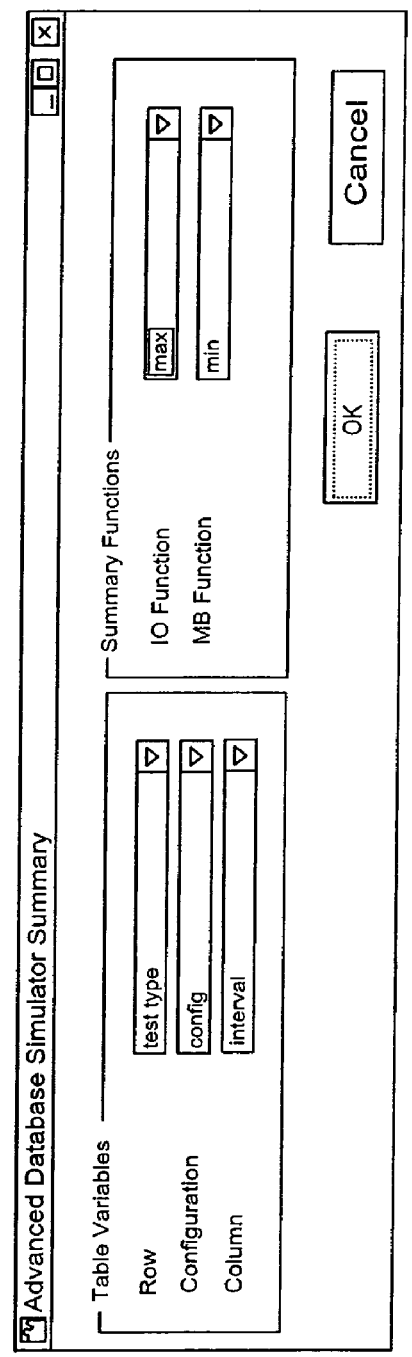

Accordingly, during the post processing phase of operation, in a preferred embodiment of the invention, referring to FIGS. 9, 10A, and 10B, the system first checks individual data points against predetermined criteria to determine if any errors have occurred. Any error data are then, in accordance with the settings by a user in the graphical user interface, either corrected, ignored, or deleted. This is indicated at 1002. The results are then compared with the expected results for this particular I/O configuration profile. This is indicated at 1004. Any deviations from standard expectations are flagged at 1006. The results then are placed into a data files in a format for later presentation and operation.

Figure 11:
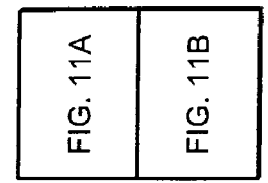
FIG. 11 is a map to the table represented by FIG. 11A and FIG. 11B.

The various data files are summarized in FIG. 11. These data files are typically statistical analysis program related files and can be used to create database simulation objects as well as being placed into the correct report format as noted above.

Trends Analysis

The trend analysis referred to above, taking place as indicated at 350, provides a series of graphs, such as those illustrated in FIGS. 8A1–8A4, 8B1–8B4, 8C1–8C4, 8D1–8D4. These graphs provide a display of the collected data in a format easily viewable by the user so as to enable the user to understand and recognize trends in the data as a function of changes in one or more parameters. Thus, changes which result over time can be plotted to clearly enable the user to see and analyze, for example, the number of I/O's per second as a result of changes in the parameter, or the number of megabits per second throughput by the controller. The illustrative presentations of FIGS. 8A1–8A4, 8B1–8B4, . . . enable such presentations to be made effectively, and preferably in color.

Figure 12:
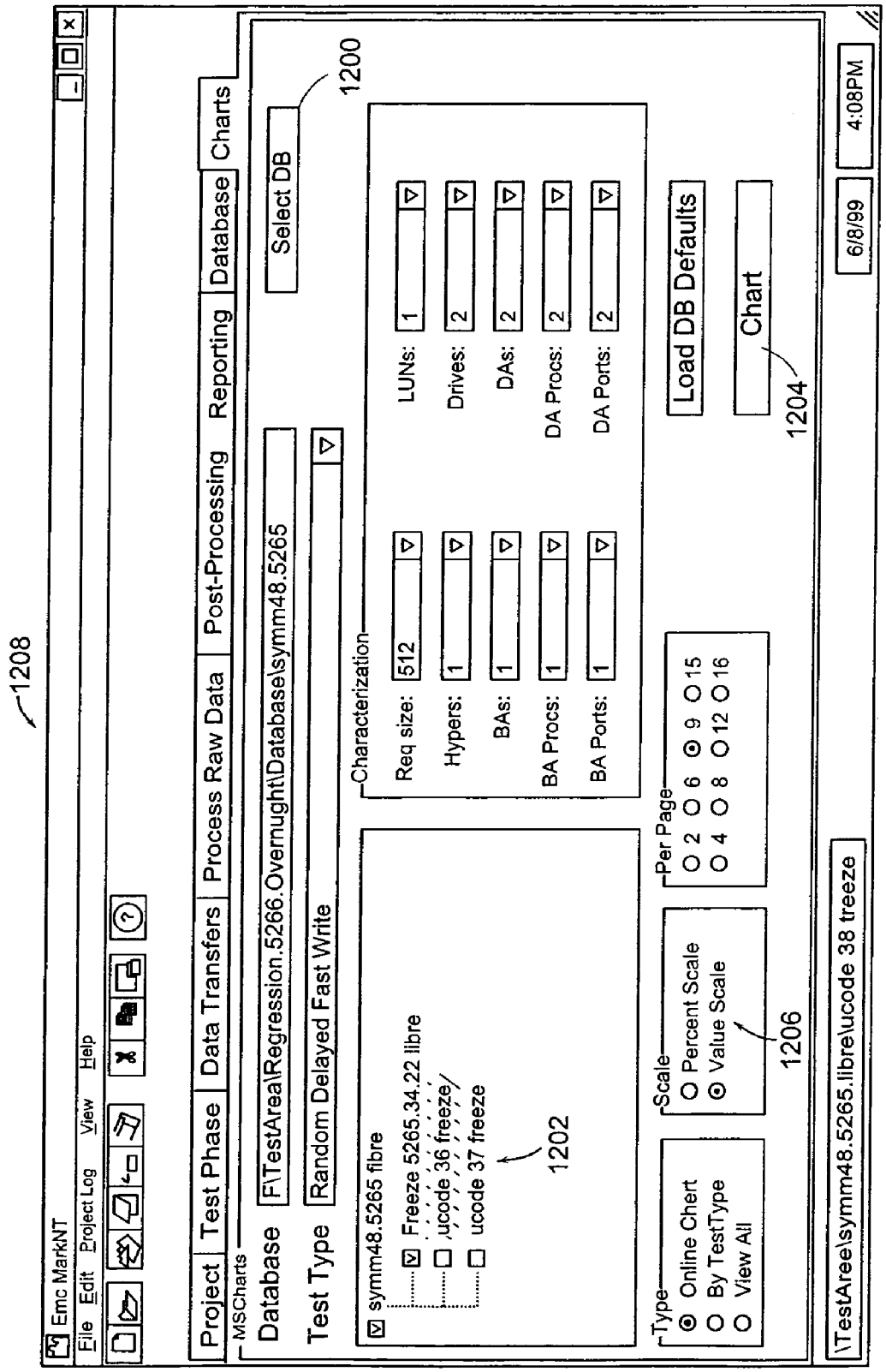
FIG. 12 shows a screen shot of the trends analysis presentation.

Referring more particularly to FIG. 12, which is a screen shot useful in connection with the trends analysis, a user can browse the available databases by selecting the "Select DB" button 1200 and selecting a database of interest. Thereafter, the system will load the database information into the form (FIG. 12) creating a selection tree 1202 on the left side, as shown, and all of the default test types and configurations will be provided in the drop down boxes.

If the chart selection was "on-line", the analysis generates the chart on the display screen. The chart can also, as an alternative, for example, be placed in a word processing document by selecting "test type" or "view all", for example, at the chart selection 1204.

The user selects the test phases which are to be graphed together. By default, the project and one test phase will be selected, however, all test phases for a project can be selected by clicking, for example, on the project. Alternatively, specific desired test phases can be selected (or deselected) as needed. As noted above, the graphs can be generated and viewed online, or printed, and can be shown according to test type or types as required. The system also, by pressing the "scale" selection 1206, will calculate the minimum and maximum values for the data and use those values to scale the graph. A percent scale is also available where the largest value of the chart is considered at 100% and all of the values are displayed accordingly.

The various specific information is shown in the characterization frame 1208 and is selected by the user and viewed as a chart online or report.

During the input process, the user selects, using the graphical user interface, the parameters which enable the graphs of FIGS. 8A1–8A4, 8B1–8B4, . . . to be generated. The data corresponding to the graphs have been previously created in the database of the system. When the graphs are presented, as illustrated in FIGS. 8A1–8A4, 8B1–8B4, . . . , the presentation identifies the parameters relating to the graph including the ports of the controller which have been used, the nature of the tests, such as a random delayed fast write, the size of the blocks which have been used, and other test parameters as indicated in the FIGS. 8A1–8A4, 8B1–8B4, 8C1–8C4, 8D1–8D4. By plotting this information in a graphical format, the user is enabled to spot trends in the data as a result of changes over time, or other parameters. This data is also available for viewing on screen.

By plotting this information in a graphical format, the user is enabled to spot trends in the data as a result of changes over time, or other parameters. This data is also available for viewing on screen.

Graphical User Interface

The system provides for a graphical user interface which enables operational parameters of the system to be created quickly, with repeatability, reliability, and use by a much broader audience. The graphic user interface is essentially a front-end device for the invention which automatically operates to generate and/or work on three types of files: configuration rule data, workload data, and benchmark data. It allows the selection of various test types based upon the user inputs which are provided in a "point and click" manner. The graphic user interface of the invention is substantially more reliable for the user and enables the user to quickly and easily define the system tests which are to be performed.

Figure 9A:
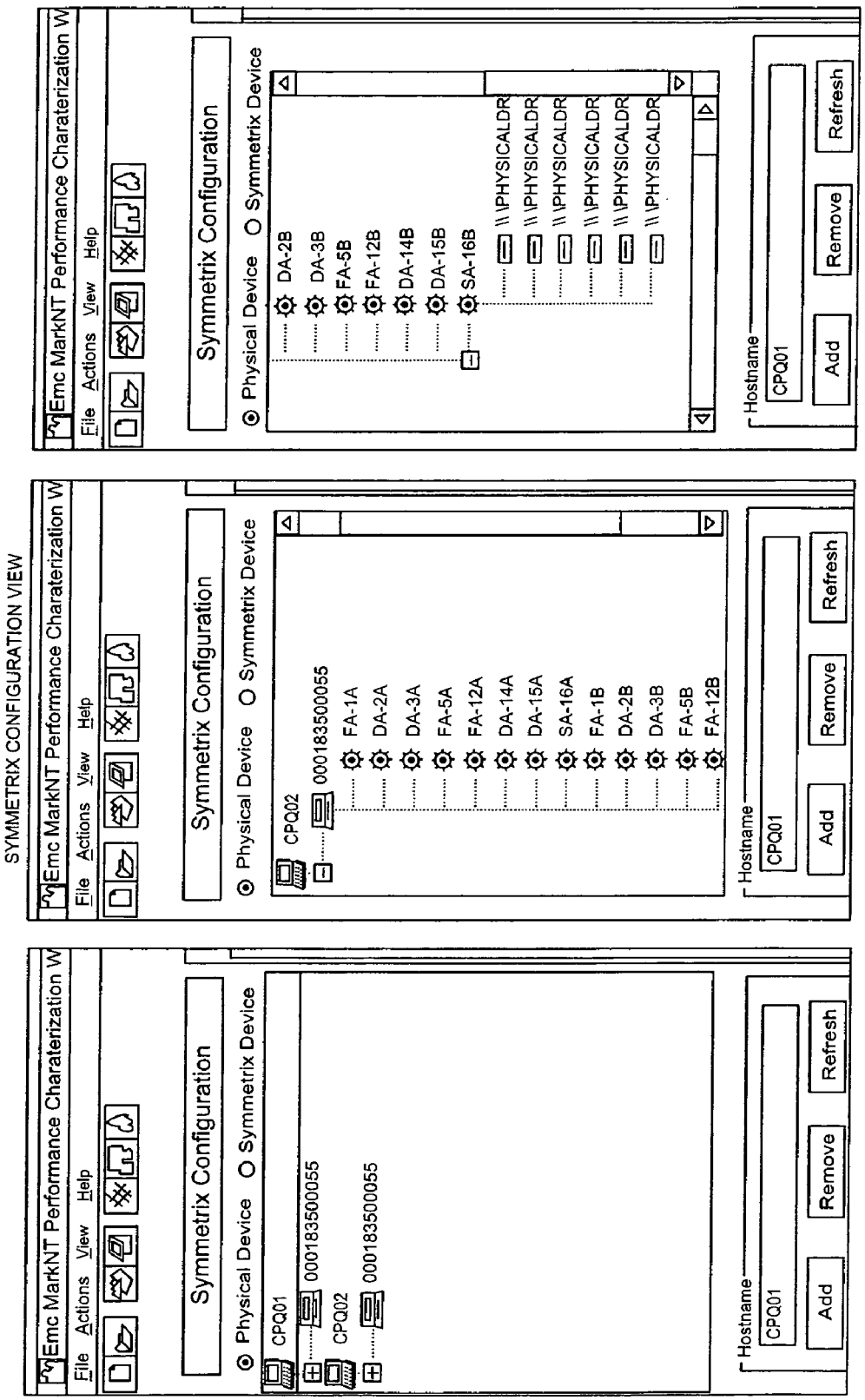
FIGS. 9A–9O show screen shots of the graphical user interface system.
Figure 9D:
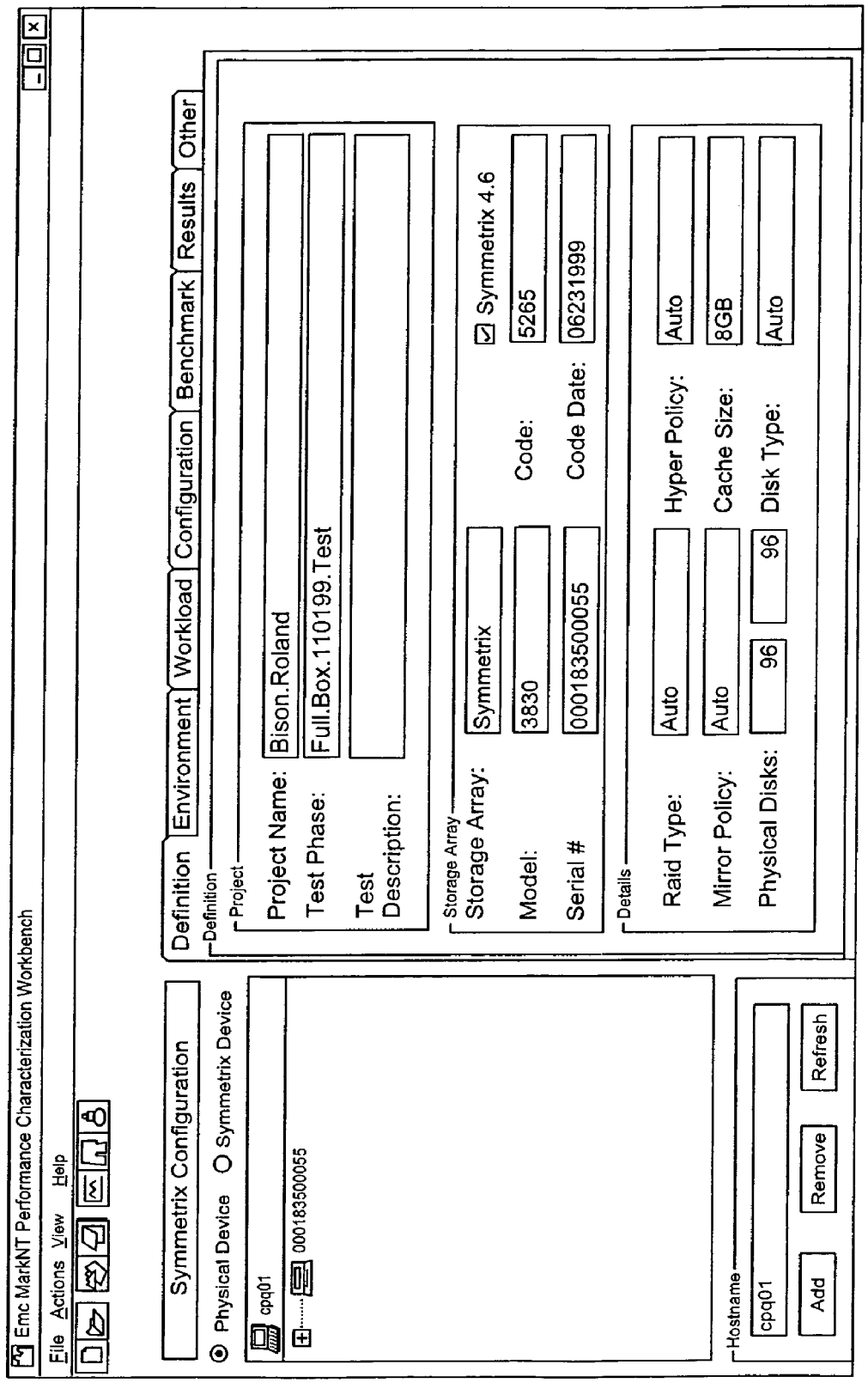
Figure 9E:
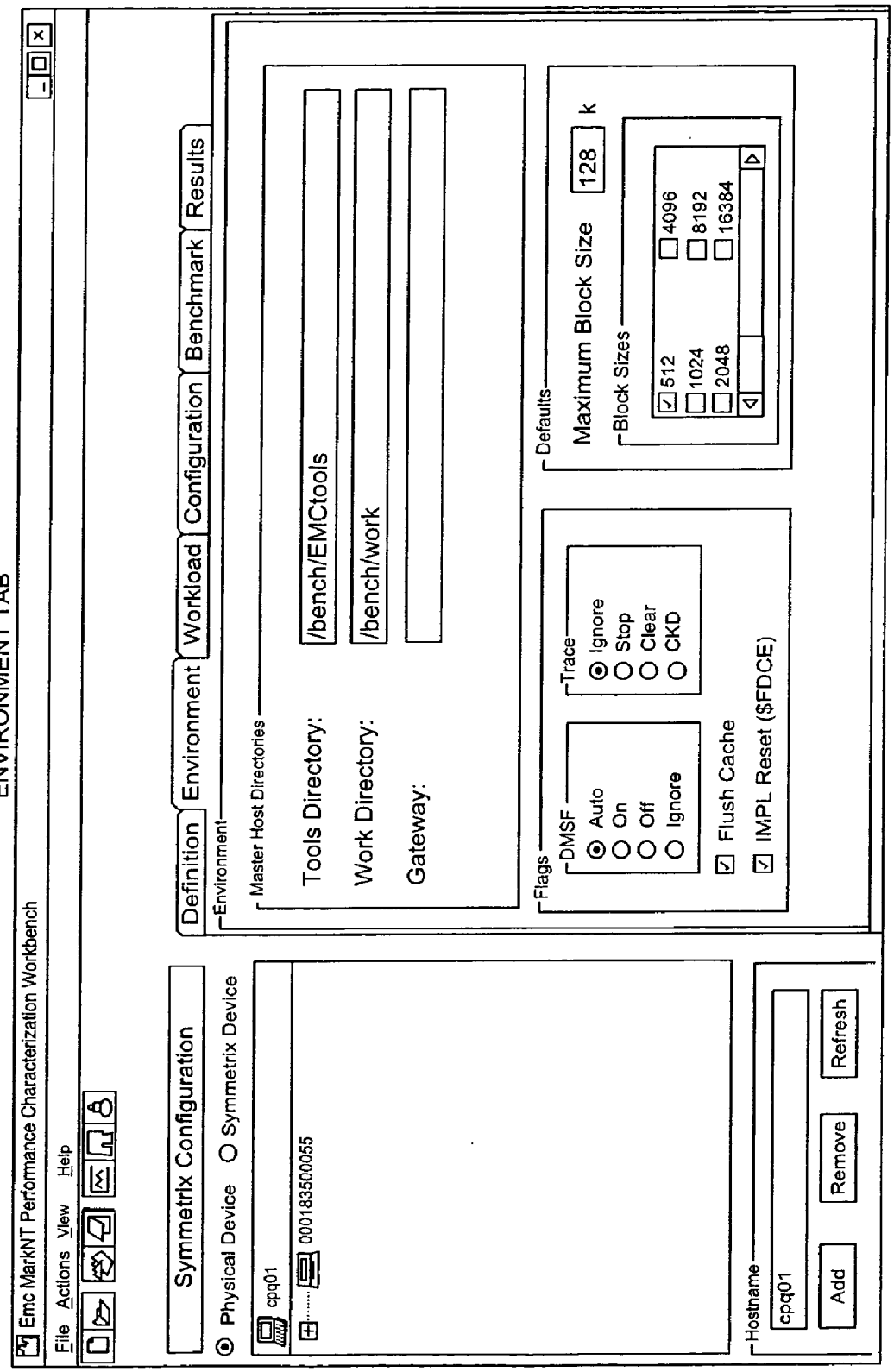
Figure 9F:
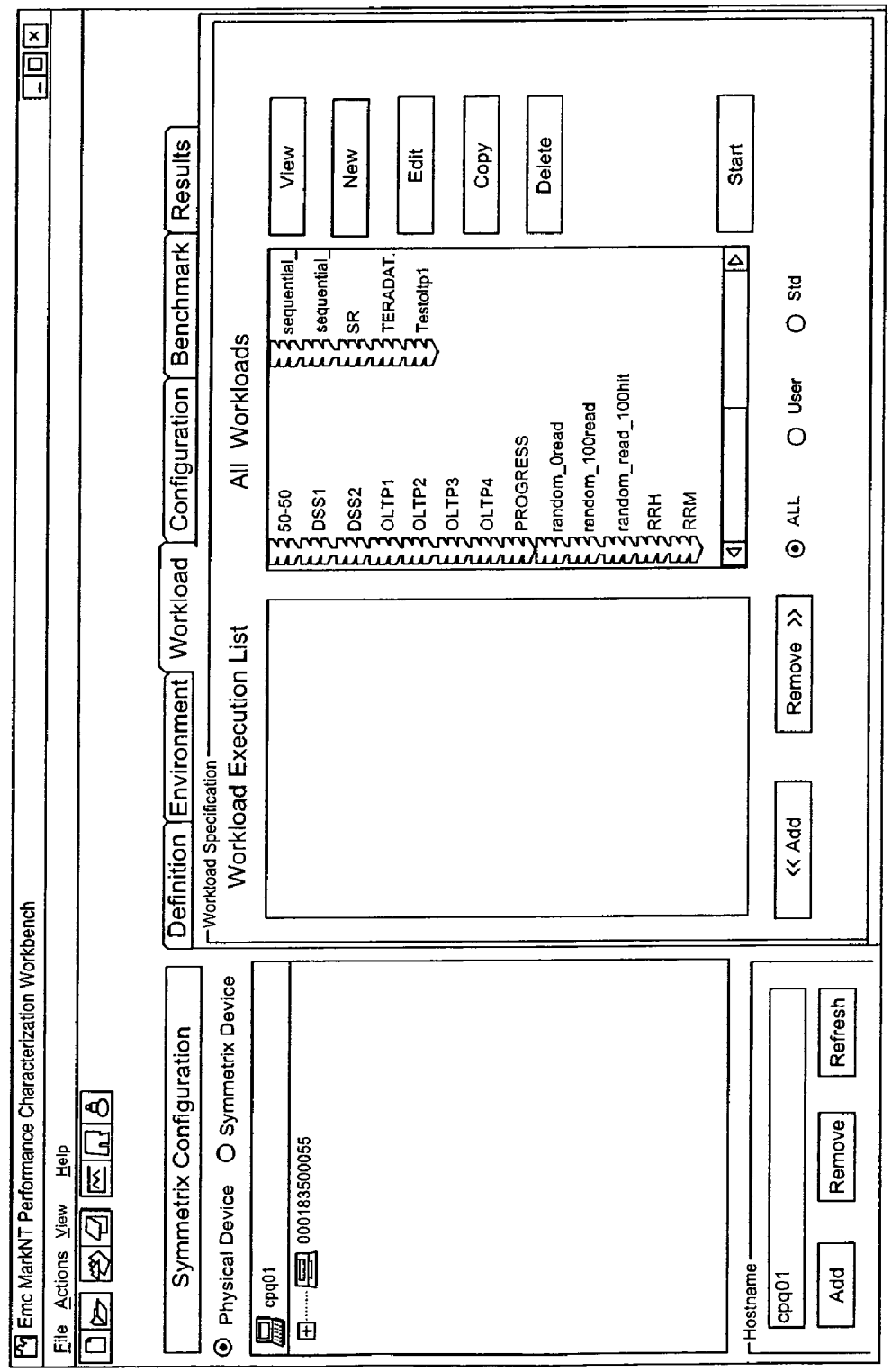
Figure 9G:
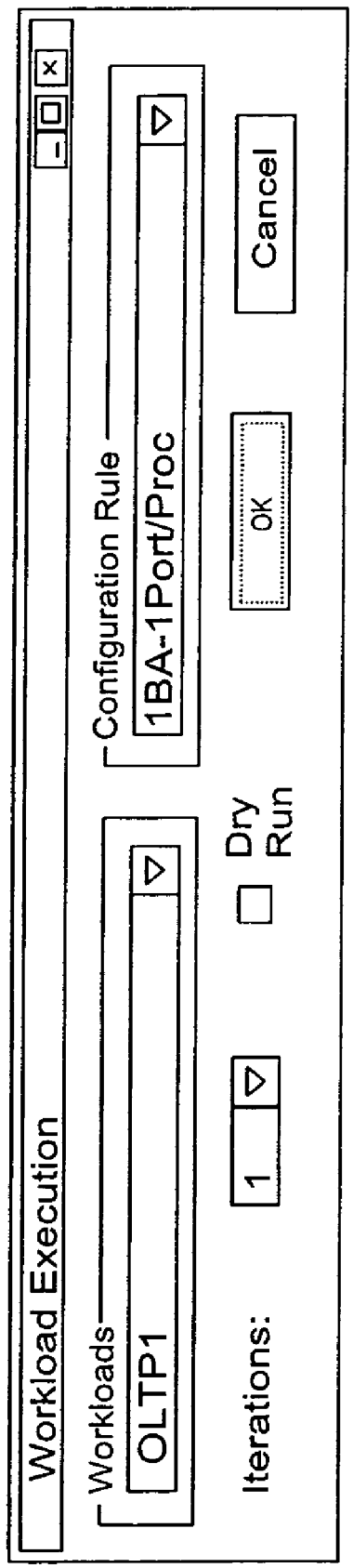
Figure 9H:
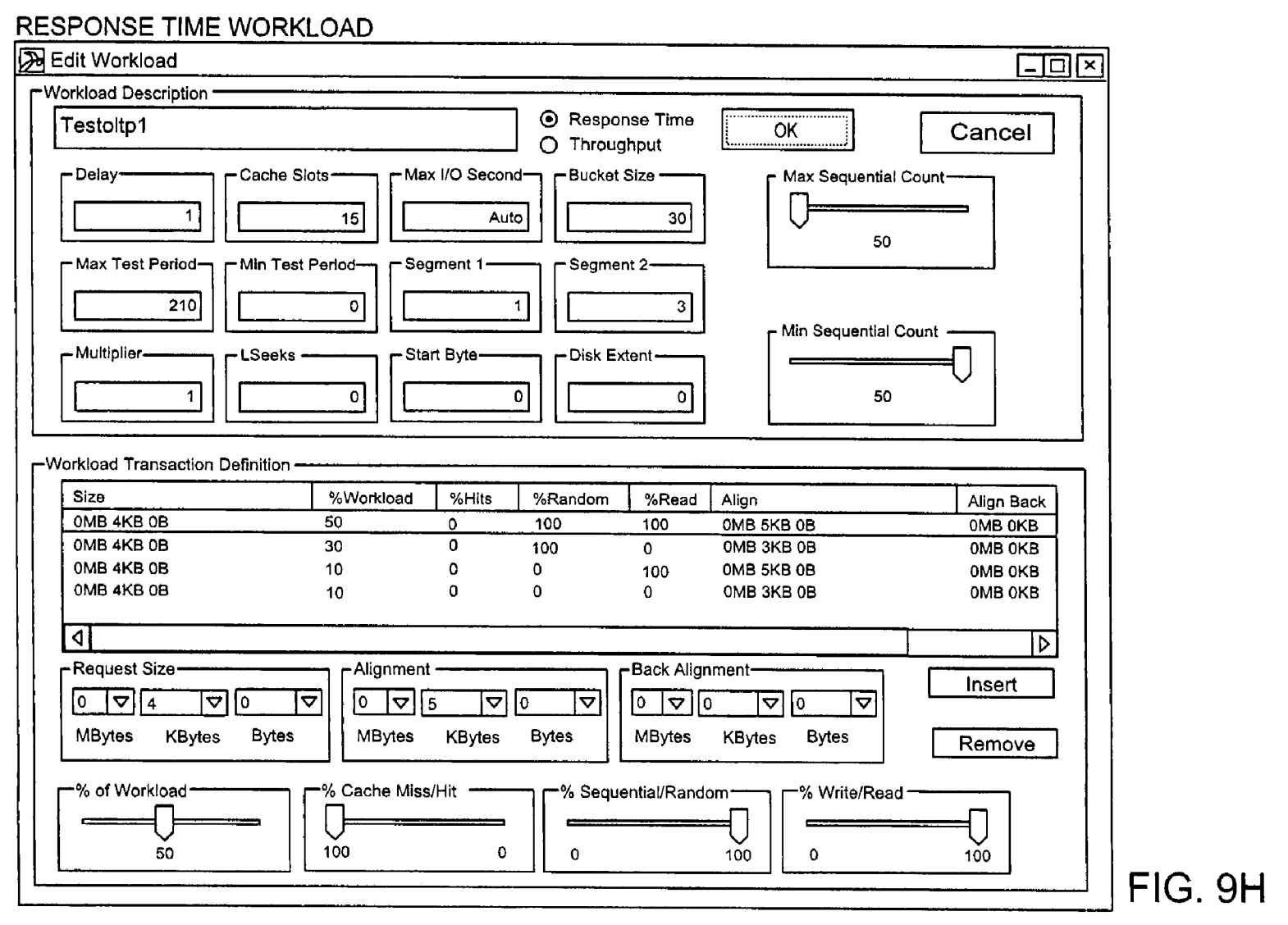
Figure 9I:
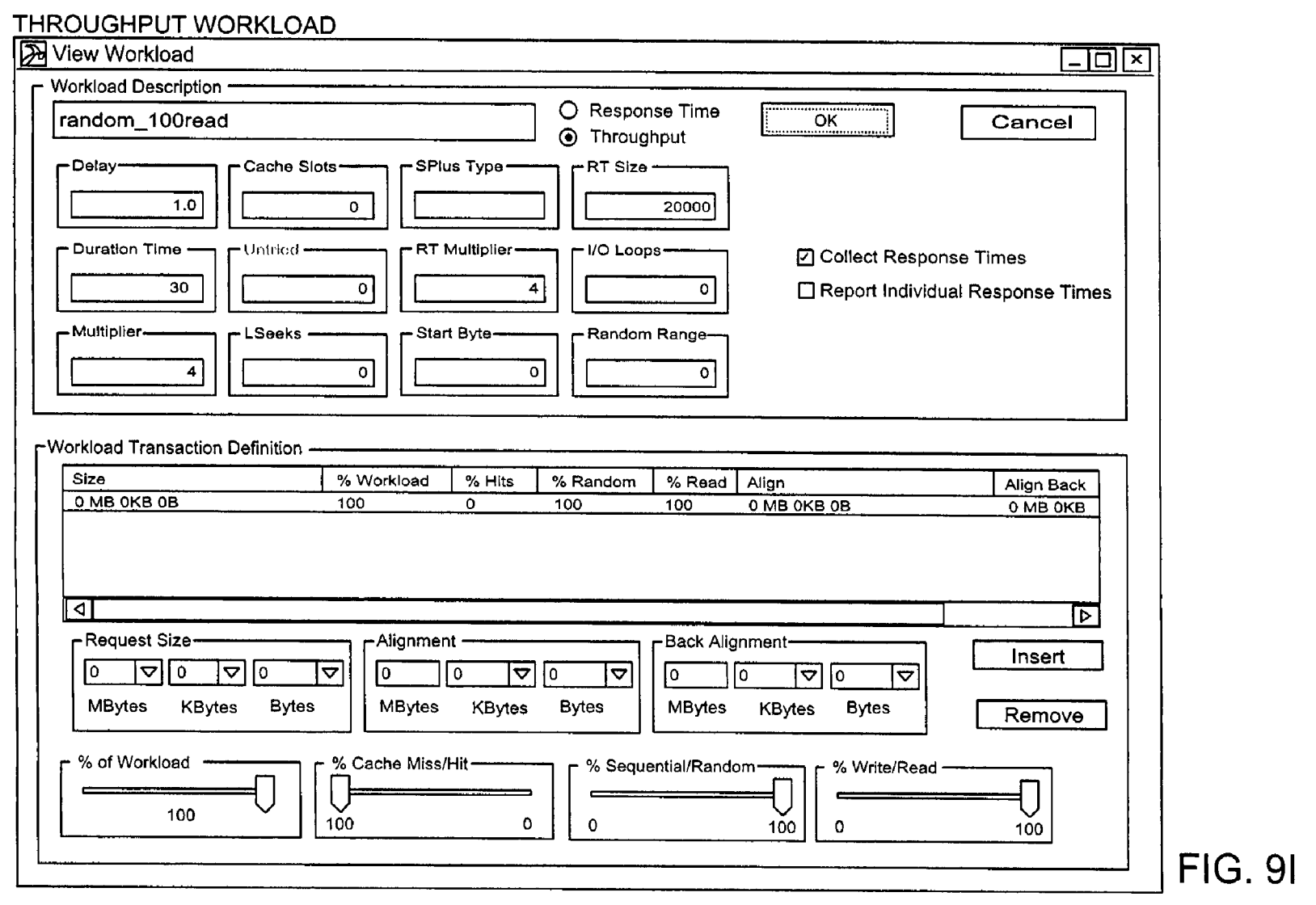
Figure 9J:
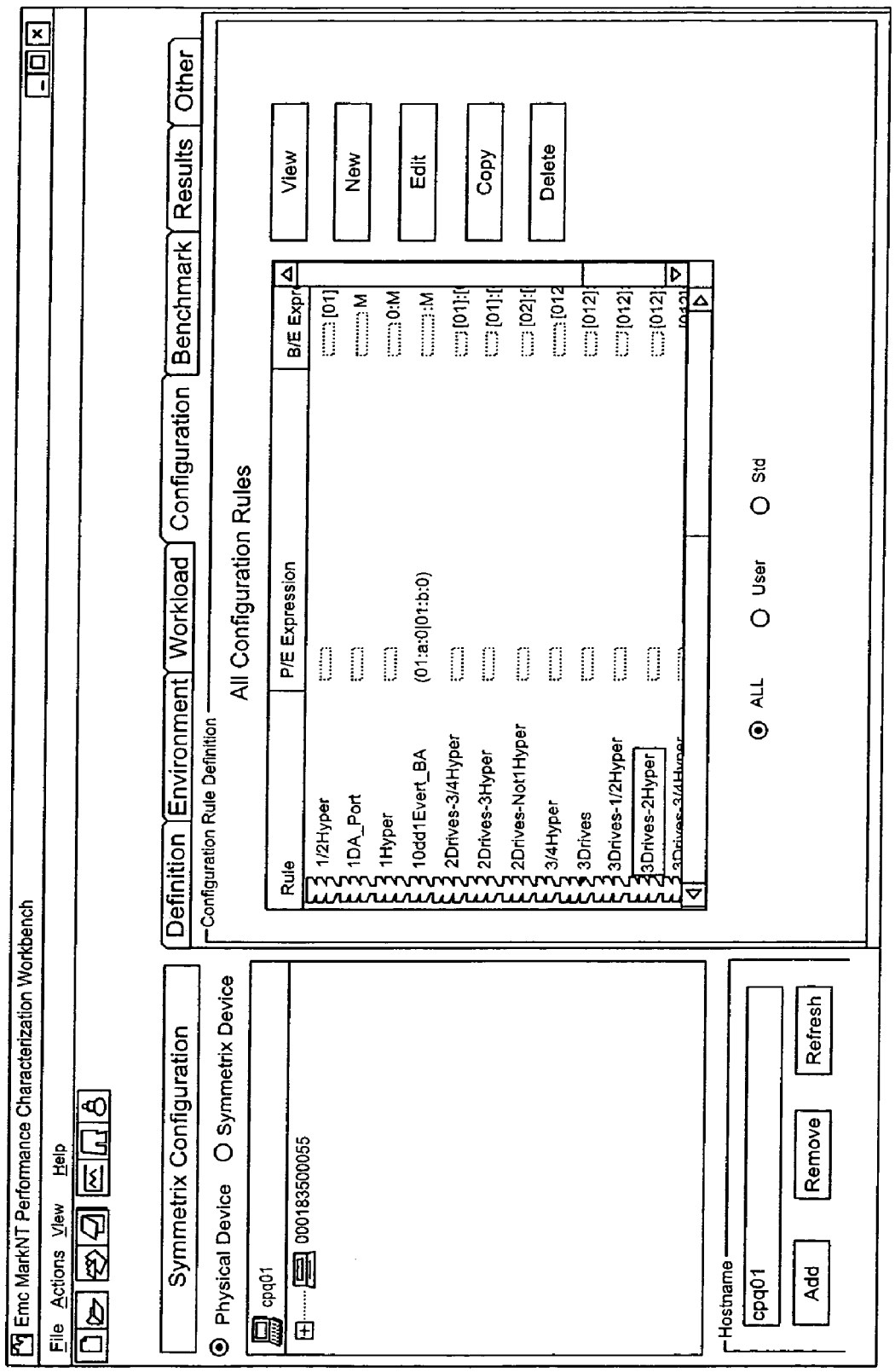
Figure 9K:
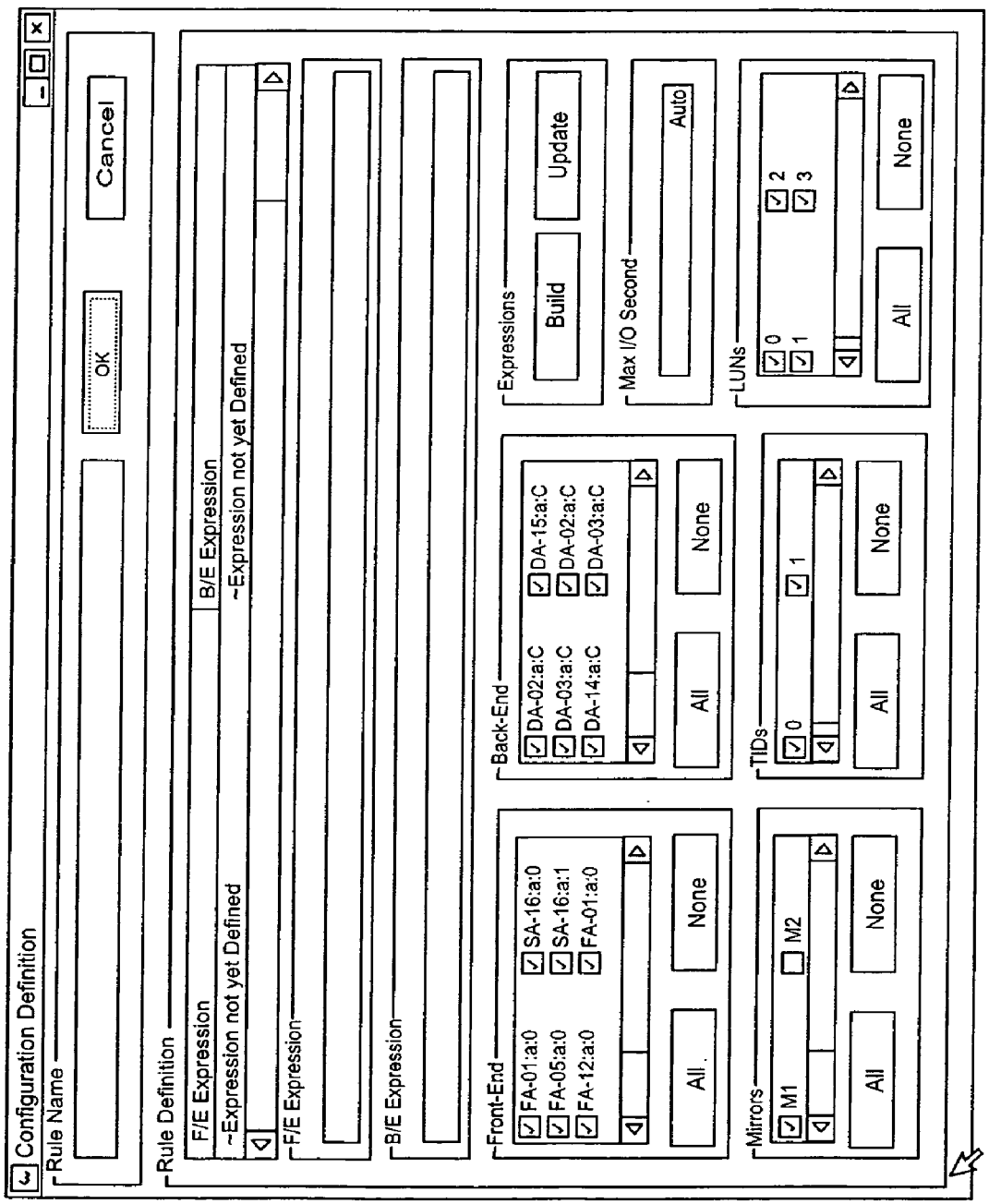
Figure 9L:
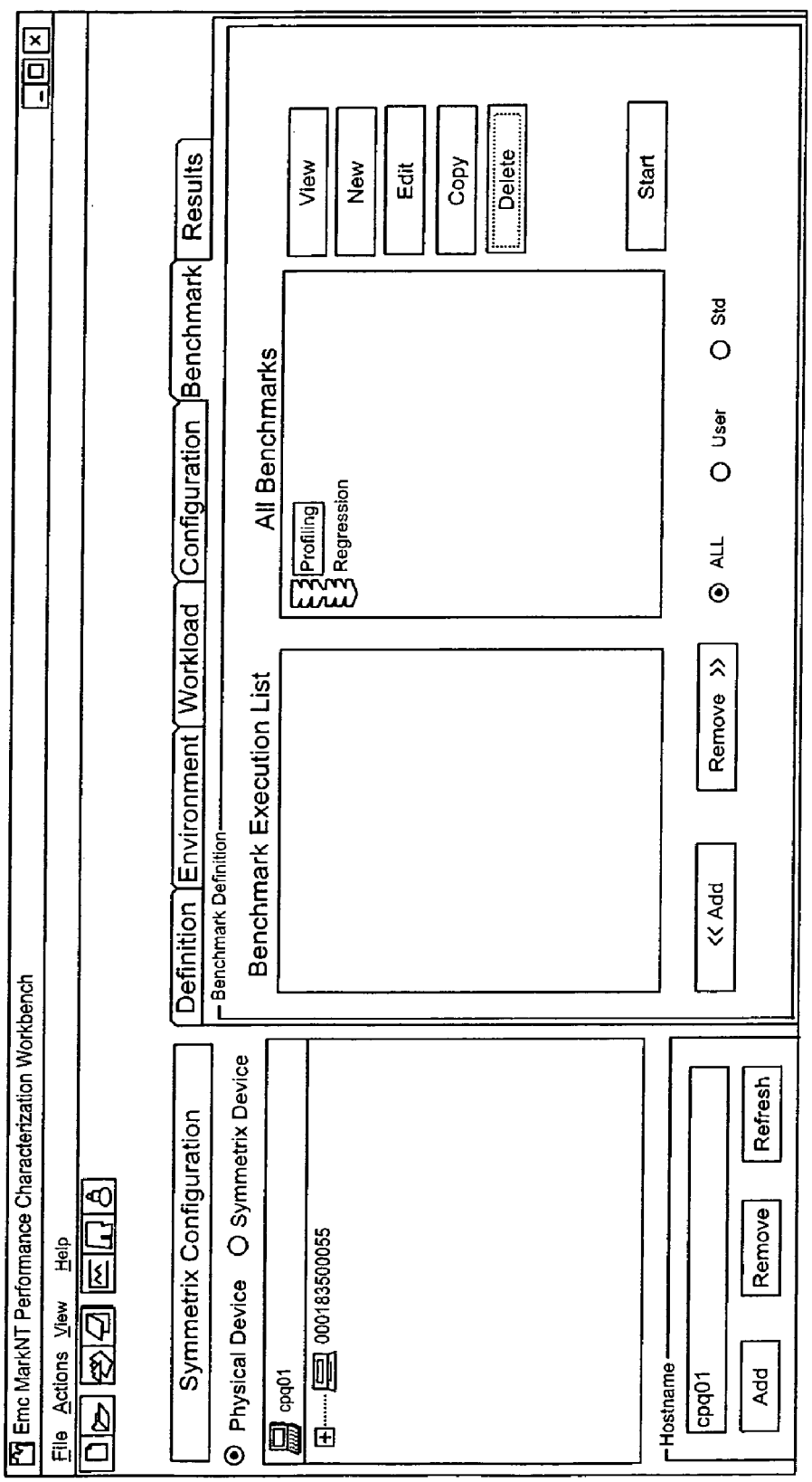
Figure 9M:
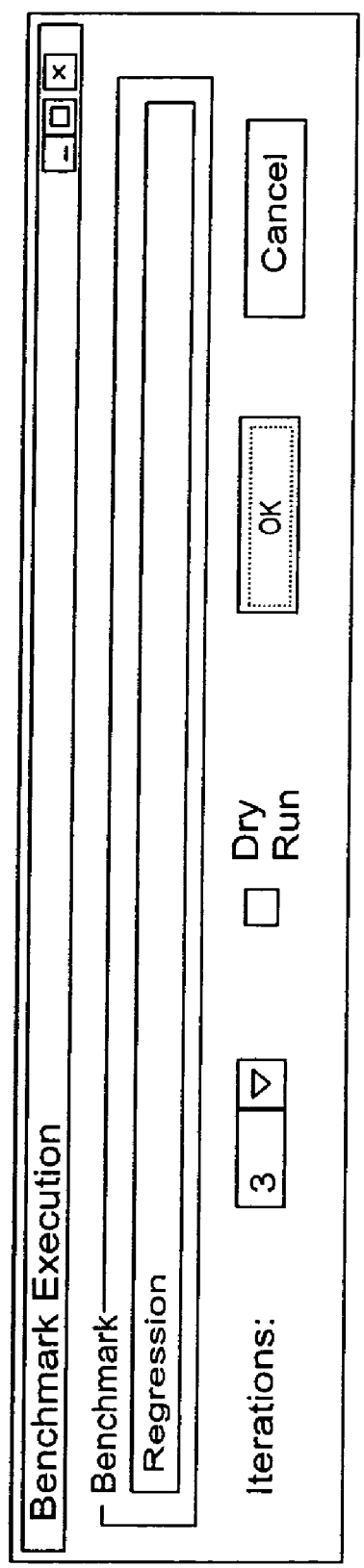
Figure 9N:
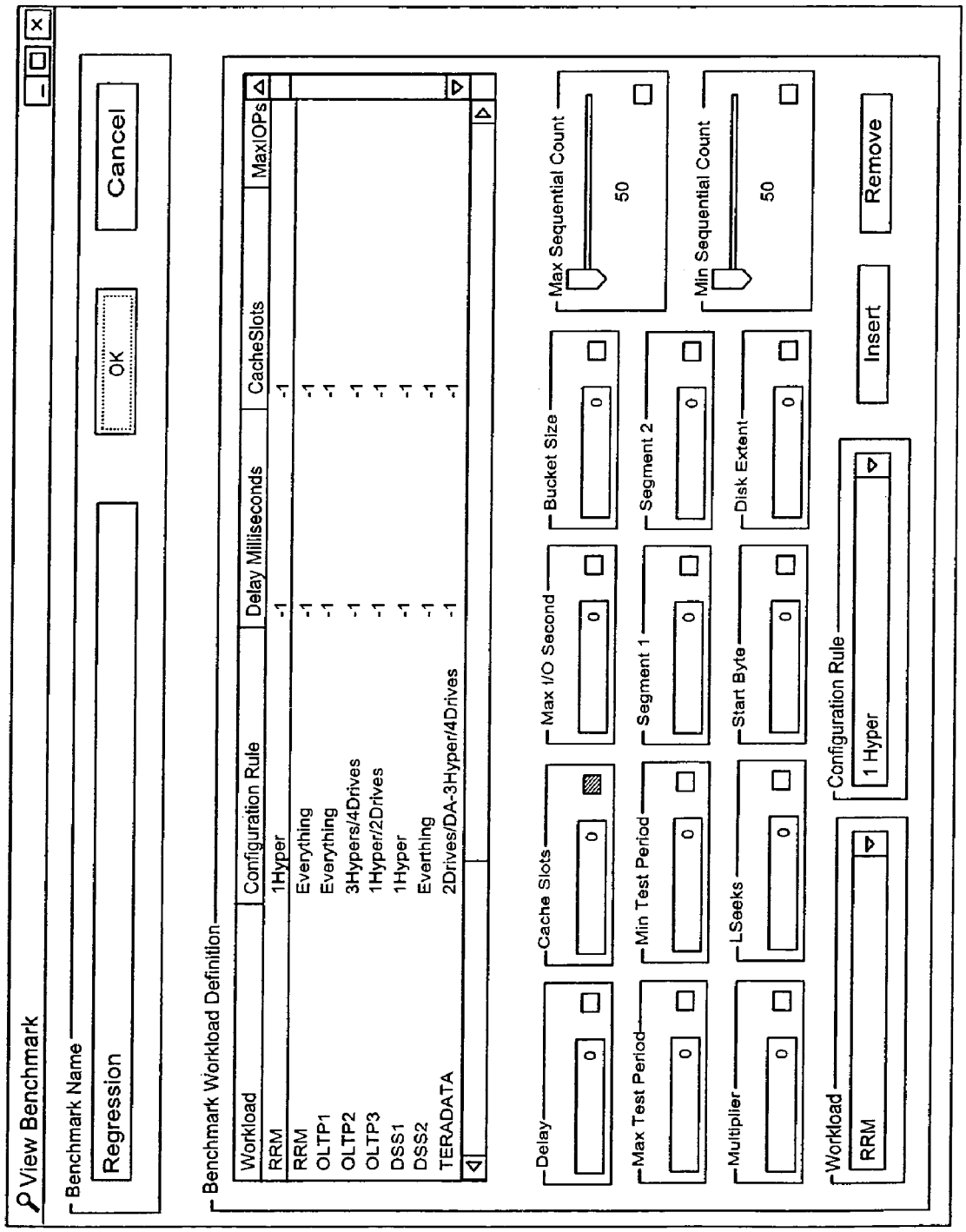
Figure 90:
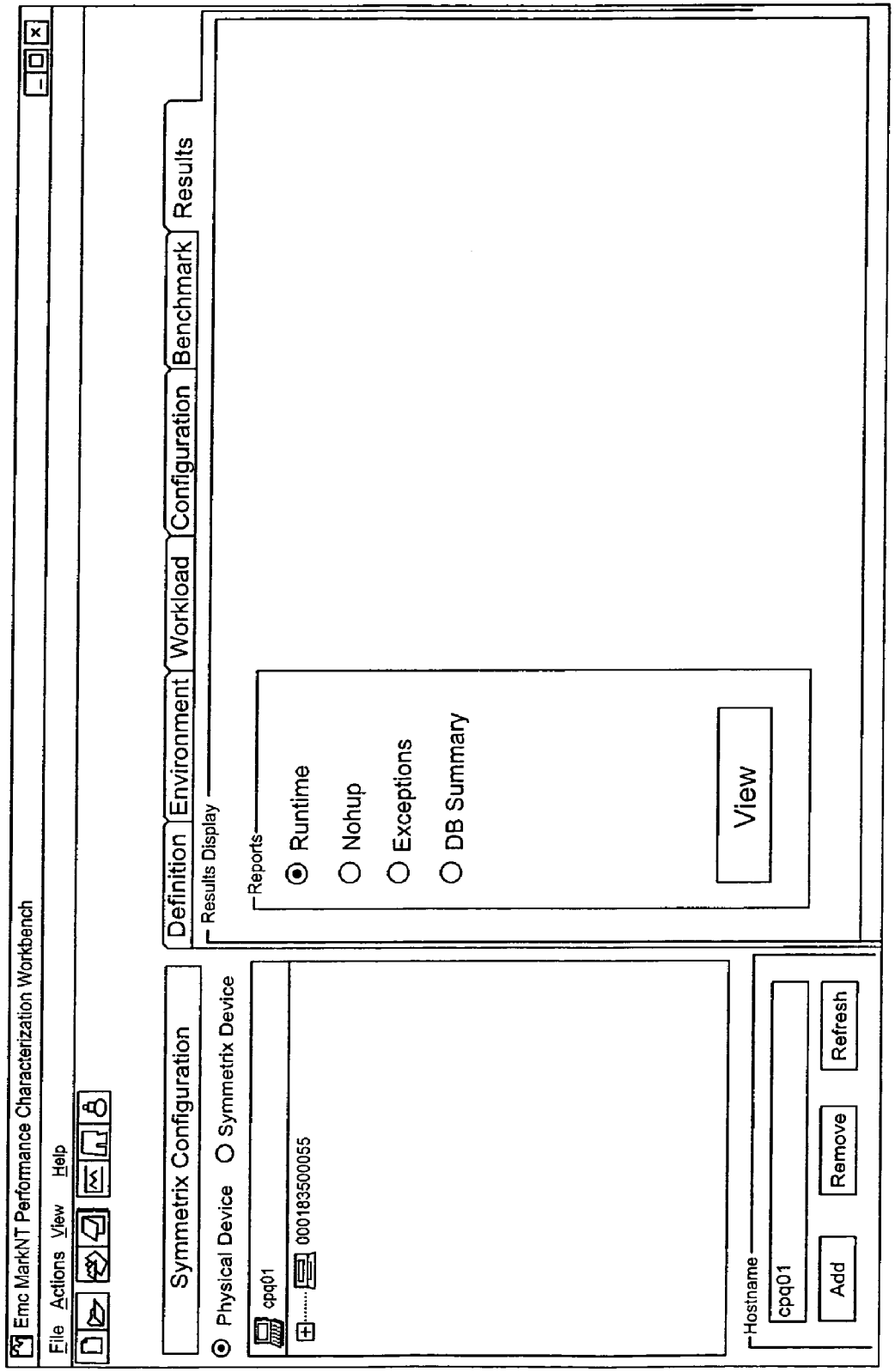

The typical graphic user interface is presented, in accordance with the invention, in FIGS. 9A, 9B, . . . In accordance with these Figures, and referring to the nomenclature either well known in the art or noted above in connection with various adaptor elements of a system, the various elements of the interface are indicated and described therein.

The user is thus enabled to form this presentation using the graphical user interface.

Additions, subtractions, and other modifications of the illustrated embodiment of the invention will be apparent to those practicing in this field and are within the scope of the following claims.

What is claimed is:

1. A method for presenting system performance to a user in a mass storage system, the storage system having a plurality of disk drive storage elements controller by a disk drive controller, said controller receiving commands and data from and returning at least data to a plurality of host computers, said method comprising:

Executing at a plurality of said host computers a test request by sending commands to said mass storage system in a coordinated time synchronized fashion, Accumulating, at said executing host computer, data regarding performance of said mass storage system, in response to the requests sent by said host computers, and Presenting said accumulated data, in a graphical plot format, for enabling the visualization of trends in the performance of said mass storage system as a function of at least one selected parameter, in response to said host generated commands.

2. The method of the claim 1 further wherein the parameter is time.

3. The method of claim 1 further wherein said accumulating step accumulates said data in a plurality of databases, and said method further comprises selecting on of said databases for viewing.

4. The method of claim 1 wherein said presenting step prints said data in said graphical plot format.

5. The method of claim 1 wherein said presenting step displays said data on a computer display in said graphical plot format.

6. The method of claim 1 wherein said method further comprises selecting at least one test phase for viewing in said graphical plot format.

7. The method of claim 1 further comprising displaying, in association with said graphical plot format, parameters relating to said graph.

8. The method of claim 1 wherein said parameters include at least one of the nature of the test, the size of data blocks which have been used, and the number of data points.

9. The method of claim 1 wherein said method further enables a user to display multiple graphs on a single sheet.

10. The method of claim 1 further comprising time synchronizing said plurality of host computers prior to executing said test request.

11. The method of claim 1 further comprising sending communications to said host computers to issue said commands prior to executing test requests.

* * * * *

UNITED STATES PATENT AND TRADEMARK OFFICE
CERTIFICATE OF CORRECTION

PATENT NO. : 7,171,338 B1
APPLICATION NO. : 09/642267
DATED : January 30, 2007
INVENTOR(S) : Kenneth R. Goguen et al.

It is certified that error appears in the above-identified patent and that said Letters Patent is hereby corrected as shown below:

Col. 10 and 11, lines 51-3;
Claim 1 on pages 51 and 52 should read:

1. A method for presenting system performance to a user in a mass storage system, the storage system having a plurality of disk drive storage elements controlle[r]d by a disk drive controller, said controller receiving commands and data from and returning at least data to a plurality of host computers, said method comprising: Executing at a plurality of said host computers a test request by sending commands to said mass storage system in a coordinated time synchronized fashion, Accumulating, at said executing host computer, data regarding performance of said mass storage system, in response to the requests sent by said host computers, and Presenting said accumulated data, in a graphical plot format, for enabling the visualization of trends in the performance of said mass storage system as a function of at least one selected parameter, in response to said host generated commands.

Signed and Sealed this

Eighteenth Day of March, 2008

JON W. DUDAS
*Director of the United States Patent and Trademark Office*